United States Patent
Osafune et al.

(10) Patent No.: US 12,454,660 B2
(45) Date of Patent: Oct. 28, 2025

(54) COMPOSITION, AEROSOL COMPOSITION, CLEANING AGENT, SOLVENT, SILICONE SOLVENT, FOAMING AGENT, HEAT-TRANSFER MEDIUM, FIRE EXTINGUISHING AGENT, AND FUMIGANT CONTAINING THE COMPOSITION, HEAT-TRANSFER DEVICE CONTAINING THE HEAT-TRANSFER MEDIUM, AND SYSTEM CONTAINING THE HEAT-TRANSFER DEVICE

(71) Applicant: Central Glass Company, Limited, Ube (JP)

(72) Inventors: Kanako Osafune, Kawagoe (JP); Masamune Okamoto, Kawagoe (JP); Kohei Sumida, Kawagoe (JP); Naoki Nishinaka, Kawagoe (JP)

(73) Assignee: Central Glass Company, Limited, Ube (JP)

( * ) Notice: Subject to any disclaimer, the term of this patent is extended or adjusted under 35 U.S.C. 154(b) by 390 days.

(21) Appl. No.: 18/108,122

(22) Filed: Feb. 10, 2023

(65) Prior Publication Data

US 2023/0193161 A1 Jun. 22, 2023

Related U.S. Application Data

(63) Continuation of application No. PCT/JP2021/021171, filed on Jun. 3, 2021.

(30) Foreign Application Priority Data

Aug. 17, 2020 (JP) .................... 2020-137461

(51) Int. Cl.
*C11D 3/24* (2006.01)
*C09K 3/30* (2006.01)
(Continued)

(52) U.S. Cl.
CPC ............ *C11D 3/245* (2013.01); *C11D 7/5009* (2013.01); *C11D 17/0043* (2013.01); *F03B 17/005* (2013.01)

(58) Field of Classification Search
CPC .. C11D 3/24; C11D 3/245; C11D 7/30; C11D 7/50; C11D 17/0043; C09K 3/30;
(Continued)

(56) References Cited

U.S. PATENT DOCUMENTS

2012/0240477 A1* 9/2012 Nappa ................ C09K 5/044
51/306
2015/0173342 A1 6/2015 Atarashi et al.
(Continued)

FOREIGN PATENT DOCUMENTS

CN 105829270 A 8/2016
CN 106715669 A 5/2017
(Continued)

OTHER PUBLICATIONS

Chinese-language Office Action issued in Chinese Application No. 202180057317.7 dated Nov. 13, 2024 with English translation (15 pages).
(Continued)

*Primary Examiner* — Brian P Mruk
(74) *Attorney, Agent, or Firm* — Crowell & Moring LLP

(57) ABSTRACT

An object is to provide a hydrofluoroolefin-based or hydrochlorofluoroolefin-based azeotropic or azeotropic-like composition. The azeotropic or azeotropic-like composition contains trans-1-chloro-3,3,3-trifluoropropene and 1-chloro-1,3,3,3-tetrafluoropropene. In the azeotropic or azeotropic-like composition, 1-chloro-1,3,3,3-tetrafluoropropene exists in an effective amount to form an azeotropic or azeotropic-like mixture with trans-1-chloro-3,3,3-trifluoropropene.

16 Claims, 6 Drawing Sheets

(51) Int. Cl.
*C11D 7/30* (2006.01)
*C11D 7/50* (2006.01)
*C11D 17/00* (2006.01)
*F03B 17/00* (2006.01)

(58) Field of Classification Search
CPC .... C09K 5/044; C09K 5/048; C09K 2205/32; C09K 2205/22; C09K 2205/126
See application file for complete search history.

(56) References Cited

U.S. PATENT DOCUMENTS

| | | |
|---|---|---|
| 2017/0218311 A1 | 8/2017 | Tani et al. |
| 2017/0297982 A1 | 10/2017 | Deur-bert et al. |
| 2020/0148930 A1 | 5/2020 | Fukushima |
| 2020/0255359 A1 | 8/2020 | Sun et al. |

FOREIGN PATENT DOCUMENTS

| | | |
|---|---|---|
| CN | 110869461 A | 3/2020 |
| JP | 2013-249326 A | 12/2013 |
| JP | 2014-5418 A | 1/2014 |
| JP | 2018-526389 A | 9/2018 |
| JP | 6575526 B2 | 9/2019 |
| KR | 10-2015-0017356 A | 2/2015 |
| WO | WO 2013/183754 A1 | 12/2013 |
| WO | WO 2016/052562 A1 | 4/2016 |

OTHER PUBLICATIONS

Korean-language Office Action issued in Korean Application No. 10-2023-7008421 dated Feb. 6, 2025 with English translation (26 pages).
Chinese-language Office Action issued in Chinese Application No. 202180057317.7 dated Jan. 13, 2024 with English translation (18 pages).
International Search Report (PCT/ISA/210) issued in PCT Application No. PCT/JP2021/021171 dated Jul. 6, 2021 with English translation (five (5) pages).
Japanese-language Written Opinion (PCT/ISA/237) issued in PCT Application No. PCT/JP2021/021171 dated Jul. 6, 2021 (four (4) pages).
English translation of document C2 (Japanese-language Written Opinion (PCT/ISA/237), filed on Feb. 10, 2023) issued in PCT Application No. PCT/JP2021/021171 dated Jul. 6, 2021 (four (4) pages).
Chinese-language Office Action issued in Chinese Application No. 202180057317.7 dated Mar. 28, 2025, with English transiation (28 pages).
Extended European Search Report issued in European Application No. 218580124 dated Jul. 4, 2024 (6 pages).

\* cited by examiner

COMPOSITION, AEROSOL COMPOSITION, CLEANING AGENT, SOLVENT, SILICONE SOLVENT, FOAMING AGENT, HEAT-TRANSFER MEDIUM, FIRE EXTINGUISHING AGENT, AND FUMIGANT CONTAINING THE COMPOSITION, HEAT-TRANSFER DEVICE CONTAINING THE HEAT-TRANSFER MEDIUM, AND SYSTEM CONTAINING THE HEAT-TRANSFER DEVICE

CROSS-REFERENCE TO RELATED APPLICATIONS

This application is a Continuation of International Patent Application No. PCT/JP2021/021171, filed on Jun. 3, 2021, which claims the benefit of priority to Japanese Patent Application No. 2020-137461, filed on Aug. 17, 2020, the entire contents of which are incorporated herein by reference.

FIELD

An embodiment of the present invention relates to a composition containing trans-1-chloro-3,3,3-trifluoropropene and 1-chloro-1,3,3,3-tetrafluoropropene.

BACKGROUND

Hydrofluoroolefins (HFOs) and hydrochlorofluoroolefins (HCFOs) have excellent environmental performance such as a short lifetime in the atmosphere and a low global warming potential. For example, Japanese Patent Application Publication No. 2013-249326 describes that cis-1-chloro-1,3,3,3-tetrafluoropropene and trans-1-chloro-1,3,3,3-tetrafluoropropene, which are HCFOs, can be used as a heat-transfer medium for refrigeration cycle systems, high-temperature heat pump systems, and organic Rankine cycles with small environmental impact.

SUMMARY

An embodiment of the present invention is a composition including trans-1-chloro-3,3,3-trifluoropropene and 1-chloro-1,3,3,3-tetrafluoropropene, where 1-chloro-1,3,3,3-tetrafluoropropene exists in an effective amount to form an azeotropic or azeotropic-like mixture with trans-1-chloro-3,3,3-trifluoropropene.

The aforementioned 1-chloro-1,3,3,3-tetrafluoropropene may be cis-1-chloro-1,3,3,3-tetrafluoropropene, trans-1-chloro-1,3,3,3-tetrafluoropropene, or a mixture thereof.

This composition may include 90.0000 mol % or more and 99.9999 mol % or less of trans-1-chloro-3,3,3-trifluoropropene and 0.0001 mol % or more and 10.0000 mol % or less of cis-1-chloro-1,3,3,3-tetrafluoropropene with respect to a total amount of trans-1-chloro-3,3,3-trifluoropropene and cis-1-chloro-1,3,3,3-tetrafluoropropene.

This composition may include 80.0000 mol % or more and 99.9998 mol % or less of trans-1-chloro-3,3,3-trifluoropropene, 0.0001 mol % or more and 10.0000 mol % or less of cis-1-chloro-1,3,3,3-tetrafluoropropene, and 0.0001 mol % or more and 10.0000 mol % or less of trans-1-chloro-1,3,3,3-tetrafluoropropene with respect to a total amount of trans-1-chloro-3,3,3-trifluoropropene, cis-1-chloro-1,3,3,3-tetrafluoropropene, and trans-1-chloro-1,3,3,3-tetrafluoropropene.

An embodiment of the present invention is an aerosol composition containing the composition.

Another embodiment of the present invention is a cleaning agent, solvent, silicone solvent, foaming agent, extinguishing agent, or fumigant containing the composition.

An embodiment of the present invention is a heat-transfer medium containing the above composition.

An embodiment of the present invention is a heat-transfer device containing the heat-transfer medium.

An embodiment of the present invention is a refrigeration cycle system, a heat pump cycle system, or an organic Rankine cycle system including the heat-transfer device.

An embodiment of the present invention is a heat-transfer method or a method for converting thermal energy to mechanical energy that utilizes the aforementioned refrigeration cycle system, high-temperature heat pump cycle system, or organic Rankine cycle system.

An embodiment of the present invention is a method for substituting 2,2-dichloro-1,1,1-trifluoroethane (HCFC-123) with the heat-transfer medium in a refrigeration cycle system, a high-temperature heat-transfer medium, a high-temperature heat pump cycle system, or an organic Rankine cycle system utilizing a heat-transfer medium containing HCFC-123.

DESCRIPTION OF EMBODIMENTS

Figure 1:
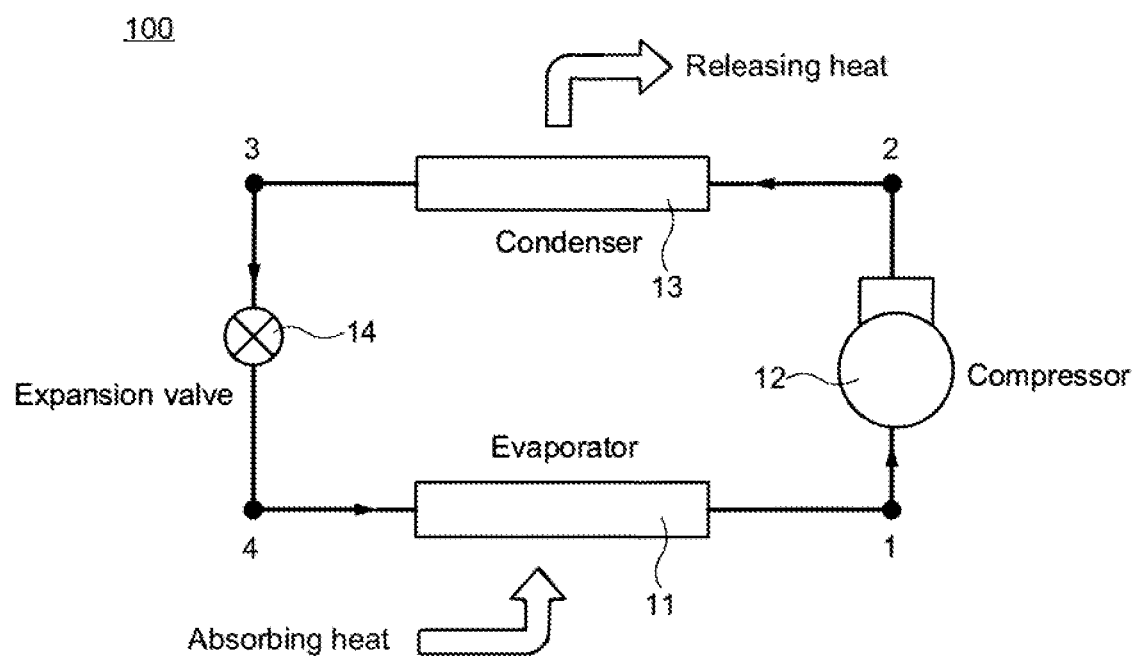
FIG. 1 is a schematic diagram of an example of a refrigeration cycle system to which the heat-transfer medium according to an embodiment of the present invention can be applied.

Hereinafter, embodiments of the present invention are explained. However, the embodiments of the present invention should not be interpreted within the description of the embodiments and examples shown below. In the drawings referred to in the embodiments and examples, the same reference number is provided to the portion or the portion having the same function, and its repetitive explanation may be omitted.

Before describing the details of the embodiments of the present invention, the terms used in the specification are explained.

1. Azeotropy

In this specification, "azeotropy" refers to azeotropy in the strict thermodynamic sense. For example, in the case of a water/ethanol mixture, a composition of ethanol (96 mass %) and water (4 mass %) is an azeotropic mixture (azeotrope), and the vapor existing in a gas-liquid equilibrium with this mixture is also "ethanol (96 mass %):water (4 mass %)" and perfectly matches the liquid composition. This phenomenon is called "azeotropy". At a specific temperature and pressure, the composition of the azeotropic mixture occupies one point. A composition which is azeotropic is called an azeotropic composition. Since an azeotropic composition volatilizes in the same composition as the liquid composition, this composition is a very preferable composition which does not change in liquid composition during use.

2. Azeotropy-Like

"Azeotropy-like" is also called "pseudo-azeotropy," and refers to the phenomenon in which a composition of a liquid and a composition of a gas in an equilibrium state with the liquid state are substantially the same, although it is not strictly thermodynamic azeotropy. Even if the compositions of the gas phase portion and the liquid phase portion do not completely match, a composition can be treated in the same way as an azeotropic composition when the compositions of the gas phase portion and the liquid phase portion substantially match. In this case, a difference in gas-liquid equilibrium composition between the gas phase portion and the liquid phase portion is preferred to be as small as possible. The phenomenon in which the gas-liquid equilibrium compositions of the gas phase portion and the liquid phase portion substantially coincide is called azeotropy-like or pseudo-azeotropy, and the composition thereof is called an azeotropic-like composition or a pseudo-azeotropic composition. "Azeotropy like" is not theoretically derived and can be found only when the compositions of the gas phase portion and the liquid phase portion substantially coincide through experimental investigation of the gas-liquid equilibrium for various liquid types and composition ratios.

Although the azeotropic phenomenon and the pseudo-azeotropic (or azeotropic-like) phenomenon should be distinguished academically, it is not necessary to distinguish between the azeotropic phenomenon and the azeotropic-like (or pseudo-azeotropic) phenomenon when mixed solvents are used as cleaning or heat-transfer mediums, or the like, and they can be treated in exactly the same way. Therefore, the azeotropic phenomenon and the azeotropic-like phenomenon (or pseudo-azeotropic phenomenon) are collectively referred to as "azeotropy (like)" in this specification. The composition at that time is called an "azeotropic (like) composition", and a composition having an azeotropic (like) composition is called an "azeotropic (like) composition". In azeotropic (like) compositions, the presence or absence of an azeotropic point is not required. It is sufficient if the gas-liquid equilibrium compositions of the gas phase portion and the liquid phase portion substantially coincide.

3. Heat-Transfer Medium

The "heat-transfer medium" refers to a medium which undergoes heat exchange with a medium to be cooled or heated in a refrigeration cycle system, a high-temperature heat pump cycle system, or an organic Rankine cycle system. The heat-transfer medium may be a single compound or a mixture. The heat-transfer medium may be represented in the art as a refrigerant, refrigerant composition, heat-transfer composition, working fluid, working fluid composition, working medium, and the like.

4. Compatibility

In this specification, "compatibility" indicates the relationship between a refrigerant and a lubricant which are judged to be compatible in accordance with the Japanese Industrial Standard JISK2211 Annex D of 2009 edition. In general, it is desirable that the refrigerant and the lubricant be compatible with each other in many heat transfer applications such as a refrigeration cycle system. A lubricant is sometimes referred to as refrigeration oil.

5. Refrigeration Cycle System

The "refrigeration cycle system" refers to a vapor-compression type refrigeration cycle system including at least an evaporator, a compressor, a condenser, and an expansion valve as elemental equipment and is a system primarily intended for cooling. The expansion valve is a device for throttle expanding the heat-transfer medium and may be a capillary tube. A refrigeration cycle system can be used as a refrigerator, an air-conditioning system, or a cooling system.

6. High-Temperature Heat Pump Cycle System

The "high-temperature heat pump cycle system" is a vapor-compression type heat pump cycle system including at least an evaporator, a compressor, a condenser, and an expansion valve as elemental equipment and is a system primarily intended for heating. The expansion valve is a device for throttle-expanding the heat-transfer medium and may be a capillary tube. A high-temperature heat pump cycle system can be used as a water-heating system, a steam generation system, or a heating device. The high-temperature heat pump cycle system may also use solar thermal energy, factory waste heat, or the like as a heat source.

7. Organic Rankine Cycle System

An "organic Rankine cycle system" is a Rankine cycle system including at least an evaporator, an expander, a condenser, and a pressure booster pump as elemental equipment and is a system primarily intended to convert thermal energy into electrical energy. An organic Rankine cycle system can be used as a power generation device to recover medium- and low-temperature heat. An organic Rankine cycle system may also use solar thermal energy, factory waste heat, or the like as a heat source.

8. Heat-Transfer System

In this specification, the above-mentioned refrigeration cycle system, high-temperature heat pump cycle system, and organic Rankine cycle system are collectively referred to as a heat-transfer system.

First Embodiment

In the present embodiment, an azeotropic (like) composition according to an embodiment of the present invention is explained.

1. Azeotropic (Like) Composition

The azeotropic (like) composition according to an embodiment of the present invention is a composition including trans-1-chloro-3,3,3-trifluoropropene and 1-chloro-1,3,3,3-tetrafluoropropene in a predetermined composition. With respect to 1-chloro-1,3,3,3-tetrafluoropropene, there are trans (E-) and cis (Z-) geometric isomers which are respectively called cis-1-chloro-1,3,3,3-tetrafluoropropene and trans-1-chloro-1,3,3,3-tetrafluoropropene. More specifically, the azeotropic (like) composition may contain 0.0001 mol % or more and 99.9999 mol % or less of trans-1-chloro-3,3,3-trifluoropropene and 0.0001 mol % or more and 99.9999 mol % or less of cis-1-chloro-1,3,3,3-tetrafluoropropene. Alternatively, the composition may contain 50.0000 mol % or more and 99.9999 mol % or less of trans-1-chloro-3,3,3-trifluoropropene and 0.0001 mol % or more and 50.0000 mol % or less of cis-1-chloro-1,3,3,3-tetrafluoropropene. Alternatively, the composition may contain 90.0000 mol % or more and 99.9999 mol % or less of trans-1-chloro-3,3,3-trifluoropropene and 0.0001 mol % or more and 10.0000 mol % or less of cis-1-chloro-1,3,3,3-tetrafluoropropene.

Alternatively, the azeotropic (like) composition may contain 0.0001 mol % or more and 99.9998 mol % or less of trans-1-chloro-3,3,3-trifluoropropene, 0.0001 mol % or more and 99.9998 mol % or less of cis-1-chloro-1,3,3,3-tetrafluoropropene, and 0.0001 mol % or more and 99.9998 mol % or less of trans-1-chloro-1,3,3,3-tetrafluoropropene. Alternatively, the composition may contain 50.0000 mol % or more and 99.9998 mol % or less of trans-1-chloro-3,3, 3-trifluoropropene, 0.0001 mol % or more and 50.0000 mol % or less of cis-1-chloro-1,3,3,3-tetrafluoropropene, and 0.0001 mol % or more and 50.0000 mol % or less of trans-1-chloro-1,3,3,3-tetrafluoropropene. Alternatively, the composition may contain 80.0000 mol % or more and 99.9998 mol % or less of trans-1-chloro-3,3,3-trifluoropropene, 0.0001 mol % or more and 10.0000 mol % or less of cis-1-chloro-1,3,3,3-tetrafluoropropene, and 0.0001 mol % or more and 10.0000 mol % or less of trans-1-chloro-1,3,3-tetrafluoropropene.

Here, the above compositions mean the ratio of each component (that is, relative proportions between the two or three components) when a total amount of trans-1-chloro-3,3,3-trifluoropropene and cis-1-chloro-1,3,3,3-tetrafluoropropene or a total amount of trans-1-chloro-3,3,3-trifluoropropene, cis-1-chloro-1,3,3,3-tetrafluoropropene, and trans-1-chloro-1,3,3,3-tetrafluoropropene is 100 mol %. In practice, compositional fluctuations hardly occur even if the liquid composition is handled in an open system or even if recovery operations by distillation are carried out when the composition is in this range.

The azeotropic (like) composition is preferred to be substantially free of impurities and of high purity. However, a small amount of by-products (for each component, usually less than 5 mass %, 3 mass %, or 1 mass % with respect to the azeotropic (like) composition) may be included as long as the properties of the azeotropic (like) composition are maintained.

1-Chloro-1,3,3,3-tetrafluoropropene can be synthesized by the following method. 1,1-Dichloro-1,3,3,3-tetrafluoropropane (234fb) is synthesized by a photochlorination reaction of 1-chloro-1,3,3,3-tetrafluoropropane (244fa). Subsequently, 1-chloro-1,3,3,3-tetrafluoropropene is obtained as a mixture of geometrical isomers of cis-1-chloro-1,3,3,3-tetrafluoropropene and trans-1-chloro-1,3,3,3-tetrafluoropropene by dehydrochlorination of 234fb using an aqueous solution of a base. As a base, both inorganic and organic bases can be used. For example, hydroxides, carbonates, bicarbonates, phosphates, or acetates of alkali metals such as lithium, sodium or potassium or hydroxides of alkaline earth metals such as calcium are exemplified. More specifically, sodium hydroxide, potassium hydroxide, calcium hydroxide, lithium carbonate, lithium bicarbonate, lithium phosphate, sodium carbonate, sodium bicarbonate, sodium phosphate, potassium carbonate, potassium hydrogen carbonate, potassium phosphate, lithium acetate, sodium formate, sodium acetate, potassium formate, and potassium acetate are exemplified. In addition, 2,6-lutidine and DBU are also applicable. The temperature for dehydrochlorination is preferred to be 0° C. to 60° C. or 15° C. to 35° C. The dehydrochlorination may be performed in the presence of a phase-transfer catalyst.

The resulting geometric isomer mixture of 1-chloro-1,3,3,3-tetrafluoropropene can be extracted from the reaction system by a reaction distillation operation at, for example, 20° C. or higher, preferably 25° C. or higher. The extracted mixture can be separated into cis-1-chloro-1,3,3,3-tetrafluoropropene and trans-1-chloro-1,3,3,3-tetrafluoropropene by purification operations such as distillation.

2. Additives

As described above, an embodiment of the present invention is a heat-transfer medium in a heat-transfer system containing this azeotropic (like) composition. When using this azeotropic (like) composition as a heat-transfer medium, the azeotropic (like) composition may be directly used, or various additives may be added. The additives are explained below.

2-1. Lubricant

As the lubricants, mineral oils (paraffine-based or naphthene-based oils) or synthetic oils such as alkylbenzenes (AB), poly-α-olefins (PAO), esters, polyol esters (POE), polyalkylene glycols (PAG) or poly(vinyl ether)s (PVE) are represented. These materials may be used alone or in combination of two or more thereof. As described below, the azeotropic (like) composition of the present invention is completely compatible with these lubricants over a wide temperature range and also has preferred compatibility with lubricants which do not contain oxygen atoms (mineral oils, alkyl benzenes, and the like). Thus, these lubricants can be effectively used as a heat-transfer medium in a heat-transfer system.

As the alkylbenzenes, n-octylbenzene, n-nonylbenzene, n-decylbenzene, n-undecylbenzene, n-dodecylbenzene, n-tridecylbenzene, 2-methyl-1-phenylheptane 2-methyl-1-phenyloctane, 2-methyl-1-phenylnonane, 2-methyl-1-phenyldodecane, 2-methyl-1-phenylundecane, 2-methyl-1-phenyltridecane 2-methyl-1-phenyltridecane, and the like are represented.

As the esters, aromatic esters of benzoic acid, phthalic acid, isophthalic acid, terephthalic acid, trimellitic acid, pyromellitic acid, and a mixture thereof, dibasic esters, polyol esters, complex esters, carbonates, and the like are represented.

As the alcohols serving as raw materials of the polyol esters, hindered alcohols such as neopentyl glycol, trimethylolethane, trimethylolpropane, trimethylolbutane, di-(trimethylolpropane), tri-(trimethylolpropane), pentaerythritol, di-(pentaerythritol), and tri-(pentaerythritol), ethylene glycol, 1,3 propanediol, propylene glycol, 1,4-butanediol, 1,2-butanediol, 2-methyl-1,3-propanediol, 1,5-pentanediol, 1,6-hexanediol, 2-ethyl-2-methyl-1,3-propanediol, 1,7-heptanediol, 2 2-methyl-2-propyl-1,3-propanediol, 2,2-diethyl-1,3-propanediol, 1,8-octanediol, 1,9-nonanediol, 1,10-dodecanediol, 1,11-undecanediol, 1,12-dodecanediol, glycerin, polyglycerin, 1,3,5-pentantriol, sorbitol, sorbitan, sorbitol-glycerol condensation products, adonitol, arabitol, xylitol, mannitol, xylose, arabinose, ribose, rhamnose, glucose, fructose, galactose, mannose, sorbose, cellobiose, and the like are represented.

As the carboxylic acids serving as raw materials for the polyol esters, butanoic acid, 2-methylpropanoic acid, pentanoic acid, 2-methylbutanoic acid, 3-methylbutanoic acid, 2,2-dimethylpropanoic acid, 2-methylpentanoic acid, 3-methylpentanoic acid, 4-methylpentanoic acid, 2,2-dimethylbutanoic acid, 2,3-dimethylbutanoic acid, 3,3-dimethylbutanoic acid, hexanoic acid, 2-methylhexanoic acid 3-methylbutanoic acid, 4-methylbutanoic acid, 5-methylbutanoic acid, 2,2-dimethylpentanoic acid, 2,3-dimethylpentanoic acid, 2,4-dimethylpentanoic acid, 3,3-dimethylpentanoic acid, 3,4-dimethylpentanoic acid, 4,4-dimethylpentanoic acid, 2-ethylpentanoic acid, 3-ethylpentanoic acid, 1,1,2-trimethylbutanoic acid, 1,2,2-trimethylbutanoicacid, 1-ethyl-1-methylbutanoicacid, 1-ethyl-2-methylbutanoic acid, octanoic acid, 2-ethylhexanoic acid, 3-ethylhexanoic acid, 3,5-dimethylhexanoic acid, 2,4-dimethylhexanoic acid, 3,4-dimethylhexanoic acid, 4,5-dimethylhexanoic acid, 2,2-dimethylhexanoic acid, 2-methylheptanoic acid, 3-methylheptanoic acid, 4-methylheptanoic acid, 5-methylheptanoic acid, 6-methylheptanoic acid, 2-propylpentanoic acid, nonanoic acid, 2,2-dimethylheptanoic acid, 2-methyloctanoic acid, 2-ethylheptanoic acid, 3-methyloctanoic acid, 3,5,5 trimethylhexanoic acid, 2-ethyl-2,3,3-trimethylbutyric acid, 2,2,4,4-tetramethylpentanoic acid, 2,2,3,3-tetramethylpentanoic acid, 2,2,3, 4-tetramethylpentanoic acid, 2-diisopropylpropanoic acid, acetic acid, propionic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, eicosanoic acid, oleic acid, and the like are represented.

As the polyalkylene glycols, compounds in which ethylene oxide, propylene oxide, butylene oxide, and the like are subjected to additional polymerization on an aliphatic alcohol having a carbon number equal to or more than 1 and equal to or less than 18, such as methanol, ethanol, a linear or branched propanol, a linear or branched butanol, a linear or branched pentanol, a linear or branched hexanol, and the like are represented.

As the poly(vinyl ethe)s, poly(methyl vinyl ether), poly (ethyl vinyl ether), poly(n-propyl vinyl ether), poly(isopropyl vinyl ether), and the like are represented.

The acid number of the lubricant is not particularly limited but is preferred to be equal to or less than 0.1 mgKOH/g or equal to or less than 0.05 mgKOH/g in order to prevent corrosion of metals used in the heat-transfer systems and the like and to prevent decomposition of the lubricant. In this specification, the acid number means the acid number measured in accordance with Japanese Industrial Standard JIS K2501.

The ash content of the lubricant is not particularly limited but is preferred to be equal to or less than 100 ppm or equal to or less than 50 ppm to improve thermal and chemical stability of the lubricant and to suppress the generation of sludge and the like. In this specification, the ash content means the value of the ash content measured in accordance with Japanese Industrial Standard JIS K2272.

The kinematic viscosity of the lubricant is not particularly limited but is preferred to be 3 to 1000 mm$^2$/s, 4 to 500 mm$^2$/s, or 5 to 400 mm$^2$/s at 40° C. Moreover, the kinematic viscosity at 100° C. is preferably 1 to 100 mm$^2$/s.

2-2. Stabilizer

As stabilizers, nitro compounds, epoxy compounds, phenols, imidazoles, amines, phosphates, hydrocarbons, and the like are represented.

Known compounds are exemplified as the nitro compounds, and aliphatic and/or aromatic derivatives are represented. As the aliphatic nitro compounds, nitromethane, nitroethane, 1-nitropropropane, 2-nitropropropane, and the like are represented, for example. As the aromatic nitro compounds, for example, nitrobenzene, o-, m-, or p-dinitrobenzene, trinitrobenzene, o-, m-, or p-nitrotoluene, o-, m-, or p-ethylnitrobenzene, 2,3-, 2,4-2,5-, 2,6-, 3,4 or 3,5-dimethyinitrobenzene, o-, m-, or p-nitroacetophenone, o-, m-, or p-nitrophenol, o-, m-, or p-nitroanisole, and the like are represented.

As the epoxy compounds, for example, monoepoxy compounds such as ethylene oxide, 1,2-butylene oxide, propylene oxide, styrene oxide, cyclohexene oxide, glycidol, epichlorohydrin, glycidyl methacrylate, phenyl glycidyl ether, allyl glycidyl ether, methyl glycidyl ether, butyl glycidyl ether, and 2-ethylhexyl glycidyl ether and polyepoxy compounds such as diepoxy butane, vinylcyclohexene dioxide, neopentyl glycol diglycidyl ether, ethylene glycol diglycidyl ether, glycerol polyglycidyl ether, trimethylolpropane triglycidyl ether, and the like are represented.

The phenols include phenols containing various substituents such as an alkyl group, an alkenyl group, an alkoxy group, a carboxyl group, a carbonyl group, and halogen in addition to a hydroxyl group. For example, monovalent phenols such as 2,6-di-t-butyl-p-cresol, o-cresol, m-cresol, p-cresol, thymol, p-t-butylphenol, o-methoxyphenol, m-methoxyphenol, p-methoxyphenol, eugenol, isoeugenol, butylhydroxyanisole, phenol, and xylenol and divalent phenols such as t-butylcatechol, 2,5-di-t-aminohydroquinone, 2,5-di-t-butylhydroquinone, and the like are represented.

As the imidazoles, 1-methylimidazole, 1-n-butylimidazole, 1-phenylimidazole, 1-benzylimidazole, 1-(p-oxyethyl) imidazole, 1-methyl-2-propylimidazole, 1-methyl-2-isobutylimidazole, 1-n-butyl-2-methylimidazole, 1,2-dimethylimidazole 1,4-dimethylimidazole, 1,5-dimethylimidazole, 1,2,5-trimethylimidazole, 1,4,5-trimethylimidazole, 1-ethyl-2-methylimidazole, and the like having an alkyl group, a cycloalkyl group, or aryl group with a linear or branched chain of 1 to 18 carbons as a substituent at the N-position are represented. These compounds may be used alone or in combination.

As the amines, benzylamine, hexylamine, diisopropylamine, diisobutylamine, di-n-propylamine, diallylamine, triethylamine, N-methylaniline, pyridine, morpholine, N-methylmorpholine, triallylamine, allylamine, a-methylbenzylamine, methylamine, dimethylamine, trimethylamine, ethylamine, diethylamine, propylamine, isopropylamine, dipropylamine, butylamine, isobutylamine, dibutylamine, tributylamine, dibenzylamine, tribenzylamine, 2-ethylhexylamine, aniline, N,N-dimethylaniline, N,N-diethylaniline, ethylenediamine, propylenediamine, diethylenetriamine, tetraethylenepentamine, diphenylamine, diethylhydroxylamine, and the like are exemplified. These compounds may be used alone or in combination.

As the hydrocarbons, aromatic unsaturated hydrocarbons such as a-methylstyrene and p-isopropenyltoluene, isoprenes, propadienes, terpenes, and the like are exemplified. These compounds may be used alone or in combination.

The stabilizer may be added beforehand to one or both of the azeotropic (like) composition and the lubricant or may be added in the heat-transfer device (e.g., condenser) in the heat-transfer system. Here, although the amount of stabilizer used is not limited, it is preferred to be equal to or more than 0.001 mass % and equal to or less than 10 mass %, equal to or more than 0.01 mass % and equal to or less than 5 mass %, or equal to or more than 0.02 mass % and equal to or less than 2 mass % with respect to the azeotropic (like) composition or a mixture of the azeotropic (like) composition and the lubricant (100 mass %). High stability of the heat-transfer medium and thermal cycling performance can be sufficiently obtained by adding the stabilizer in these ranges.

2-3. Desiccant

When the azeotropic (like) composition according to an embodiment of the present invention is used as the heat-transfer medium, it is preferred to have a low moisture content. Specifically, equal to or less than 50 ppm, equal to or less than ppm, or equal to or less than 10 ppm is preferred based on the total amount of the heat-transfer medium. Adverse influences on the thermal stability, chemical stability, and electrical insulation properties of the azeotropic (like) composition and other additives can be prevented by controlling the moisture content.

Therefore, desiccants useful in removing water may be used as an additive. The desiccant may be selected from activated alumina, silica gel, molecular sieves represented by zeolite, and combinations thereof. The type of the molecular sieves is not limited, but zeolite is particularly preferred in terms of chemical reactivity with the heat-transfer medium, moisture absorption capacity as a desiccant, and fracture strength. Representative zeolites include Zeolam A-3 and Zeolam A-4 (manufactured by Tosoh Corp.) but are not limited to these zeolites. The pore diameter of the zeolite is not particularly limited, but 3 A or 4 A is particularly preferred for selective removal of the moisture in the system without adsorption of the heat-transfer medium. Adsorption of the heat-transfer medium to the zeolite is less likely to occur, and corrosion of the materials constituting the system and generation of insoluble products can be suppressed by using zeolite with the aforementioned pore diameter.

The size of the zeolite-based desiccant is not particularly limited, but a size equal to or more than 0.5 mm and equal to or less than 5 mm is preferred in order to prevent clogging in the system and to avoid reducing the drying capacity. The shape of the zeolite-based desiccant is not particularly limited, but a spherical or cylindrical shape is preferred.

The azeotropic (like) composition according to an embodiment of the present invention includes trans-1-chloro-3,3,3-trifluoropropene and 1-chloro-1,3,3,3-tetrafluoropropene which are both an HCFO. Since HCFO is highly compatible with a variety of solvents, a homogeneous composition can be readily prepared. In general, however, such a composition has the inherent problem that the liquid composition is prone to fluctuation. That is, even if compatibility can be secured by mixing multiple types of liquids, the problem of fluctuating liquid composition due to the differences in volatility between each component is unavoidable. For example, when a binary liquid composition is used as a cleaning agent in an ultrasonic cleaner, the low-boiling point component with high volatility (component with high vapor pressure) generally volatilizes preferentially, and the high-boiling point component with low volatility is concentrated in the cleaning tank. For example, in the case of a composition of a low-boiling component with high detergency and a high-boiling component with low detergency, the concentration of the low-boiling component in the cleaning solution may decrease over time, causing a cleaning failure. In particular, if a nonflammable composition is formulated by blending a nonflammable solvent with a combustible solvent, the cleaning solution may become a combustible composition if the nonflammable component preferentially volatilizes.

In addition, although it is desirable from both environmental protection and economic standpoints to recover and reuse cleaning solvents by operations such as distillation after use, the two components with different boiling points generally have to be recovered separately in the case of a two-component liquid system, and the recovery and reuse of the liquid tend to impose operational burdens.

A similar problem exists when used as the heat-transfer medium in the heat-transfer system. That is, the liquid composition may fluctuate during long-term operation of the heat-transfer system. If the liquid composition of the fluid changes, the heat capacity, viscosity, or affinity with the lubricant of the heat-transfer medium may change, and the operating performance of the heat-transfer system may deteriorate.

Moreover, a non-azeotropic binary (multinary) liquid composition may undergo a compositional change when used as a heat-transfer medium, when filling refrigeration or air-conditioning equipment from a storage container, or when leaking from a heat-transfer system. Therefore, when a binary (multinary) liquid composition is used as a cleaning agent or a heat-transfer medium, the liquid composition must be analyzed frequently, and the volatilized component must be constantly blended to an appropriate ratio to keep a proper composition range. However, such liquid composition control causes a large work burden.

However, as shown in the Examples, the inventors conducted liquid-gas equilibrium experiments of trans-1-chloro-3,3,3-trifluoropropene and 1-chloro-1,3,3,3-tetrafluoropropene to find an azeotropic (like) composition in which the composition of the liquid phase is substantially identical to the composition of the gas phase. As a result, the azeotropic (like) composition according to an embodiment of the present invention, namely, a composition including trans-1-chloro-3,3,3-tetrafluoropropene and cis-1-chloro-1,3,3,3-tetrafluoropropene or a composition including trans-1-chloro-3,3,3-tetrafluoropropene, cis-1-chloro-1,3,3,3-tetrafluoropropene, and trans-1-chloro-1,3,3,3-tetrafluoropropene was found to be an azeotropic (like) composition in which the compositions of the gas phase portion and the liquid phase portion are substantially the same in a specific composition.

Trans-1-chloro-3,3,3-trifluoropropene and 1-chloro-1,3,3,3-tetrafluoropropene included in the azeotropic (like) composition include a carbon-carbon double bond in the molecule and are highly reactive with hydroxyl radicals, and therefore have excellent environmental performance such as a short lifetime in the atmosphere as well as a low ozone depletion potential and global warming potential. Hence, it is possible to provide a heat-transfer medium with a low environmental impact, small composition change, and heat cycle characteristics equivalent or superior to those of existing refrigerants by using this azeotropic (like) composition.

Second Embodiment

In this embodiment, a heat-transfer system using a heat-transfer medium containing the azeotropic (like) composition described in the First Embodiment and a heat-transfer method using the system are described with reference to the drawings. The heat-transfer medium and the heat-transfer method are applicable not only to small package-type equipment but also to factory-scale large systems.

1. Refrigeration Cycle System

A refrigeration cycle system refers to a system in which the heat of an object to be cooled such as air, water, brine, silicone oil, or the like is transferred as evaporation latent heat of a refrigerant in an evaporator, the generated refrigerant vapor is compressed by applying work in a compressor, the condensation heat is exhausted to liquefy the refrigerant in a condenser, and then the condensed refrigerant is throttle-expanded by an expansion valve to a low pressure and a low temperature and fed into an evaporator to be evaporated. In this system, the refrigerant receives the thermal energy of the object to be cooled in the evaporator, by which the object to be cooled is cooled to a lower temperature. This system can be applied to a variety of known systems because the system provides thermal energy of the refrigerant to the load fluid to heat the load fluid to a higher temperature in the condenser. In the refrigeration cycle system according to an embodiment of the present invention, the heat-transfer medium described in the First Embodiment is used as the refrigerant in the evaporator and condenser, which allows the generation of chilled water below 10° C., 7° C., or 5° C.

FIG. 1 is a schematic diagram of an example of the refrigeration cycle system 100 to which the heat-transfer medium according to an embodiment of the present invention can be applied. The refrigeration cycle system 100 includes an evaporator 11 for capturing heat and a condenser 13 for supplying heat. Furthermore, the refrigeration cycle system 100 has a compressor 12 for pressurizing the vapor of the heat-transfer medium that exits in the evaporator 11 and an expansion valve 14 for throttle-expanding the heat-transfer medium in the supercooled state exiting the condenser 13. The refrigeration cycle system 100 also has pipes for transporting the heat-transfer medium between these elemental components. In addition to these elemental components, the refrigeration cycle system 100 may also have an internal heat exchanger, a dryer, a liquid separator, an oil recovery unit, and a non-condensable gas separator.

The type of compressor is not limited, and the compressor may be a single-stage or multi-stage centrifugal compressor or a positive displacement compressor. As a positive displacement compressor, a rotary piston compressor, a rotary vane compressor, a scroll compressor, a screw compressor, a piston/crank compressor, or a piston/swash plate compressor may be used. In order to maximize the heat transfer characteristics of the heat-transfer medium, it is particularly preferable to use a single-stage or multi-stage centrifugal compressor.

When repeating the heat cycle of the refrigeration cycle system 100 using the heat-transfer medium according to an embodiment of the present invention, it is possible to extract thermal energy more than the electric power input to the compressor 12 from a medium to be cooled in the evaporator 11, i.e., cooling, through the following processes (a) to (d).

(a) The refrigerant in a liquid state is subjected to heat exchange with a fluid to be cooled (air, water, etc.) to be vaporized in the heat exchanger (evaporator 11).

(b) The vaporized refrigerant is extracted from the heat exchanger, and the vaporized refrigerant is allowed to pass through the compressor 12 to supply high pressure superheated steam.

(c) The refrigerant exiting from the compressor 12 is allowed to pass through the condenser 13, and the refrigerant in a gas state is subjected to heat exchange with the fluid to be heated (air, water, etc.), thereby liquefying the refrigerant.

(d) The liquefied refrigerant is throttle-expanded with the expansion valve 14 to supply low-pressure wet steam which is recirculated back to the Process (a).

If a non-condensable gas is mixed in the refrigeration cycle system 100, adverse effects such as poor heat transfer and increased operating pressure may occur in the condenser and the evaporator. Thus, it is preferable to take actions to prevent non-condensable gas from being mixed. Trans-1-chloro-3,3,3-trifluoropropene and 1-chloro-1,3,3,3-tetrafluoropropene according to an embodiment of the present invention have lower vapor pressure than existing refrigerants, and a negative pressure operation may occur in the heat cycle system depending on the operating conditions. Since oxygen contained in the air which may be mixed during a negative pressure operation reacts with the heat-transfer medium and lubricant, it is preferable to remove oxygen outside the heat cycle system using a non-condensable gas separator or the like.

The heat-transfer medium according to an embodiment of the present invention can be applied to a refrigeration cycle system using or designed to use a heat-transfer medium (environmentally hazardous heat-transfer medium) exemplified by 2,2-dichloro-1,1,1-trifluoroethane (HCFC-123) and having a large global warming potential (GWP) and non-negligible ozone depletion potential (ODP). In such a refrigeration cycle system, the influence on global warming and the ozone layer can be drastically decreased and the environmental burden can be reduced by replacing the environmentally hazardous heat-transfer medium with the heat-transfer medium according to an embodiment of the present invention.

As described above, an embodiment of the present invention is a method for replacing an environmentally hazardous heat-transfer medium used in a refrigeration cycle system with the heat-transfer medium of the present invention. One aspect of this method is to recover all of the accommodated environmentally hazardous heat-transfer medium and then fill the system with the heat-transfer medium according to an embodiment of the present invention. The method for replacing the heat-transfer medium is not particularly limited, and it is preferable to perform the replacement when the refrigeration cycle system is not in operation. Recovery of the environmentally hazardous heat-transfer medium is preferably carried out using recovery equipment used when recovering fluorocarbon refrigerants to reduce the load on the environment. The filling method with the heat-transfer medium is not particularly limited and may be carried out by utilizing the pressure difference between the heat-transfer medium and the refrigeration cycle system or by using mechanical power of a pump or the like.

2. High-Temperature Heat Pump Cycle System

Hereinafter, a high-temperature heat pump cycle system according to an embodiment of the present invention is explained. The high-temperature heat pump cycle system is a vapor compression type heat-transfer system similar to the refrigeration cycle system 100 shown in FIG. 1 and is intended for heating by heat exchange in the condenser. Here, the heat-transfer medium according to an embodiment of the invention is used as the working medium used in the condenser and the evaporator, by which hot water, pressurized hot water, or steam of 60° C. or more, 80° C. or more, or 110° C. or more can be generated. Note that, in addition to the elemental components shown in FIG. 1, the high-temperature heat pump cycle system may include an internal heat exchanger, a dryer, a liquid separator, an oil recovery unit, and a non-condensable gas separator.

The condensation temperature of the heat-transfer medium in the high-temperature heat pump cycle system is equal to or higher than 60° C. and equal to or lower than 170° C., preferably equal to or higher than 80° C. and equal to or lower than 150° C. The condensation pressure of the heat-transfer medium is determined by the composition and the condensation temperature of the heat-transfer medium. In other words, the condensation pressure is equal to the saturated vapor pressure of the heat-transfer composition at the condensation temperature. Generally, when the condensation pressure exceeds 5.0 MPa, high pressure resistance performance is required for the compressor, the condenser, and the pipe components, resulting in an increase in cost. When the heat-transfer medium according to the present invention is used, the condensation pressure can be lower than 5.0 MPa, and known compressors, condensers, evaporators, expansion valves, and pipe components can be used.

The type of compressor is not limited, and the compressor may be a single-stage or multi-stage centrifugal compressor or a positive displacement compressor. As the positive displacement compressor, a rotary piston compressor, a rotary vane compressor, a scroll compressor, a screw compressor, a piston/crank compressor, or a piston/swash plate compressor may be used.

When a non-condensable gas is mixed in a high-temperature heat pump cycle system, adverse influences such as poor heat transfer and increased operating pressure may occur in the condenser and the evaporator. Thus, it is preferable to take actions to prevent a non-condensable gas from being mixed in the system. Therefore, similar to the above-mentioned refrigeration cycle system 100, it is preferred to remove oxygen contained in the air, which may be mixed when the system is operated under a negative pressure due to operating conditions, outside the heat cycle system using a non-condensable gas separator or the like.

When repeating the high-temperature heat pump cycle system using the heat-transfer medium according to an embodiment of the present invention, it is possible to extract thermal energy more than the power input to the medium to be heated in the condenser through the following processes (a) to (d).

(a) The working medium in a liquid state is subjected to heat exchange with a fluid to be cooled (air, water, etc.) in the heat exchanger (evaporator) to be vaporized.

(b) The vaporized working medium is extracted from the heat exchanger, and the vaporized working medium is allowed to pass through the compressor to supply high pressure superheated steam.

(c) The working medium exiting the compressor is allowed to pass through the condenser, and the working medium in a liquid state is subjected to heat exchange with the fluid to be heated (air, water, etc.) to be liquefied.

(d) The liquefied working medium is throttle-expanded by the expansion valve to supply low-pressure wet steam which is recirculated back to the Process (a).

Moreover, the heat-transfer medium according to an embodiment of the present invention can be applied to a high-temperature heat pump cycle system using or designed to use a heat-transfer medium exemplified by 2,2-dichloro-1,1,1-trifluoroethane (HCFC-123) and having a large global warming potential (GWP) and a non-negligible ozone depletion potential (ODP). In such high-temperature heat pump cycle systems, by replacing the environmentally hazardous heat-transfer medium with the heat-transfer medium of an embodiment of the present invention, the impact on global warming and the ozone layer can be significantly decreased and the environmental impact can be reduced.

As described above, an embodiment of the present invention is a method for replacing an environmentally hazardous heat-transfer medium used in a high-temperature heat pump cycle system with the heat-transfer medium of the present invention. One aspect of this method is substantially the same as the aforementioned method for replacing an environmentally hazardous heat-transfer medium used in a refrigeration cycle system with the heat-transfer medium according to an embodiment of the present invention.

3. Organic Rankine Cycle System

Figure 2:
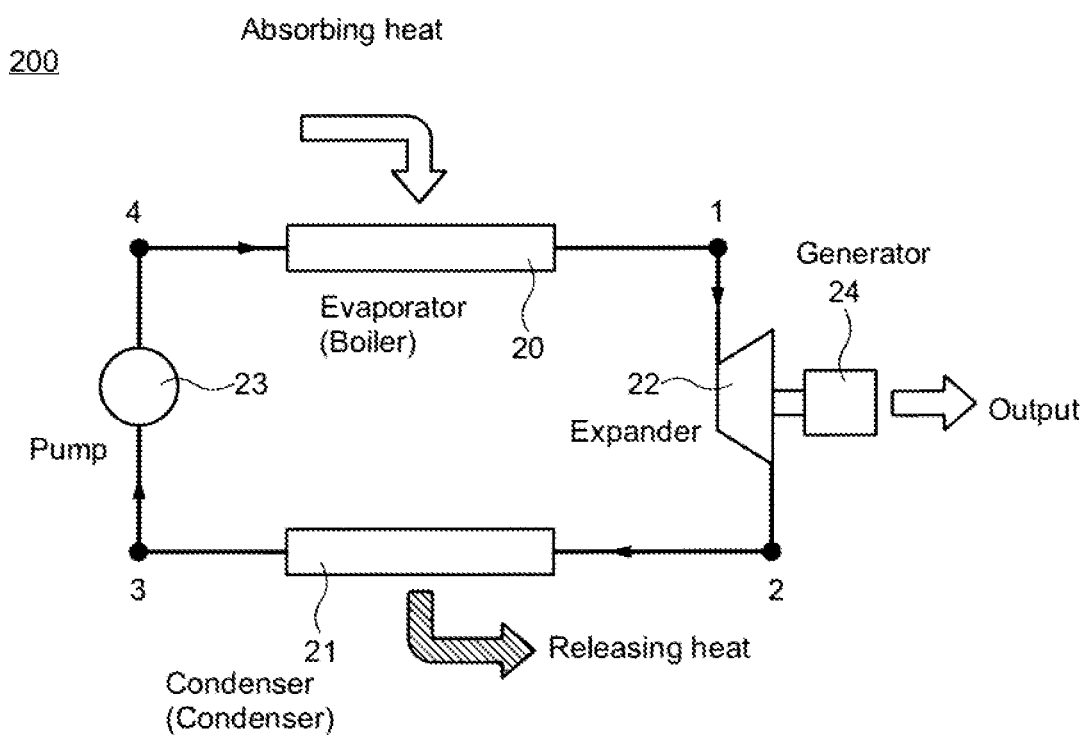
FIG. 2 is a schematic diagram of an example of an organic Rankine cycle system to which the heat-transfer medium according to an embodiment of the present invention can be applied as a working medium.

Hereinafter, the organic Rankine cycle system according to an embodiment of the present invention is explained. FIG. 2 is a schematic diagram of an example of the organic Rankine cycle system 200 according to an embodiment of the present invention. Thermal energy of a temperature equal to or higher than 50° C. and equal to or lower than 200° C. or equal to or higher than 80° C. and equal to or lower than 150° C. can be converted to mechanical energy by using the heat-transfer medium according to an embodiment of the present invention as a working medium of the organic Rankine cycle system 200.

The organic Rankine cycle system 200 includes an evaporator 20 (boiler) receiving heat and a condenser 21 (condenser) supplying heat. In addition, the organic Rankine cycle system 200 has an expander 22 adiabatically expanding the working medium, a circulating pump 23 increasing the pressure of the working medium exiting the condenser 21 and consuming electricity, and pipes transporting the working medium between these elemental components, and drives a generator 24 generating electricity using the expander 22. The type of expander is not limited, and the expander may be a single-stage or multi-stage centrifugal expander or a positive displacement expander. As the positive displacement expander, a rotary piston expander, a rotary vane expander, a scroll expander, a screw expander, or a piston-crank expander may be used. In addition to the above-mentioned elemental components, the organic Rankine cycle system 200 may include an internal heat exchanger, a dryer, a liquid separator, an oil recovery unit, and a non-condensable gas separator.

If a non-condensable gas is mixed in the organic Rankine cycle system 200, adverse influences such as poor heat transfer and increased operating pressure may occur in the condenser and the evaporator. Therefore, it is preferable to take actions to prevent a non-condensable gas from being mixed in the system. Hence, it is preferred to include a non-condensable gas separator or the like.

In the organic Rankine cycle system 200, thermal energy is supplied from a heating source to the working medium in the evaporator, the working medium that has become steam in a high-temperature and high-pressure state is adiabatically expanded in the expander, and the work generated by this adiabatic expansion is used to drive the generator to generate electricity. The working medium vapor after the adiabatic expansion is condensed by the cooling source in the condenser to be liquefied and then transferred to the evaporator by a pump. As the fluid to be cooled or heated that serves as a heating source and a cooling source, air, water, brine, silicone oil, and the like are represented. These fluids are preferred to be selected and used according to the cycle operating temperature conditions. For example, as the fluid to be cooled, hot water, pressurized hot water, or stream at a temperature equal to or higher than 50° C. and equal to or lower than 200° C. or equal to or higher than 80° C. and equal to or lower than 120° C. may be used. Alternatively, waste heat at a medium to low temperature equal to or lower than 200° C. may be used. Alternatively, renewable thermal energy may be used for the heating source.

When repeating the organic Rankine cycle using the heat-transfer medium according to an embodiment of the present invention as a working medium, thermal energy can be converted to mechanical energy and extracted as electrical energy through the generator through the following processes (a) to (e)

(a) The liquid working medium is subjected to heat exchange with the fluid to be cooled (heating source) to be vaporized (phase change from liquid to gas) in the heat exchanger (evaporator 20).

(b) The vaporized working medium is extracted from the heat exchanger.

(c) The vaporized working medium is allowed to pass through the expander (turbine for power generation) 22 to be expanded to convert the thermal energy to mechanical (electrical) energy.

(d) The working medium exiting the expander is allowed to pass through the condenser to condense the gaseous working medium (phase change from gas to liquid).

(e) The liquefied working medium is transferred with the circulation pump 23 while increasing the pressure and is recirculated back to the Process (a).

The evaporation temperature of the working medium is equal to or higher than 50° C. and equal to or lower than 200° C. or equal to or higher than 80° C. and equal to or lower than 150° C.

The evaporation pressure of the working medium is determined by the composition and the evaporation temperature of the working medium. In other words, the evaporation pressure is equal to the saturated vapor pressure of the working medium at the evaporation temperature. Generally, when the evaporation pressure exceeds 5.0 MPa, high pressure resistance performance is required for the compressor, the condenser, and the pipe components, causing an increase in cost. When the heat-transfer medium according to an embodiment of the present invention is used as the working medium, the evaporation pressure can be lower than 5.0 MPa, and known expanders, condensers, pumps, and pipe components can be used.

In addition, the heat-transfer medium according to an embodiment of the present invention can be applied to the organic Rankine cycle system using or designed to use a working medium (environmentally hazardous working medium) represented by 2,2-dichloro-1,1,1-trifluoroethane (HCFC-123) and having a large global warming potential (GWP) and a non-negligible ozone depletion potential (ODP). The influences on global warming and the ozone layer can be significantly decreased and the environmental impact can be reduced by replacing such an environmentally hazardous working medium with the heat-transfer medium according to an embodiment of the present invention.

As described above, an embodiment of the present invention is a method for replacing an environmentally hazardous working medium used in an organic Rankine cycle system with the heat-transfer medium according to an embodiment of the present invention. One aspect of this method is to recover all of the accommodated environmentally hazardous working medium and then fill the system with the heat-transfer medium according to an embodiment of the present invention. The method for replacing the working medium is not particularly limited, and it is preferred to perform the replacement when the operation of the organic Rankine cycle system is stopped. Recovery of the environmentally hazardous working medium is preferably carried out using the recovery equipment used when recovering fluorocarbon refrigerants in order to reduce the load on the environment. The accommodating portion of the organic Rankine cycle system may be depressurized with a vacuum pump after recovering the environmentally hazardous working medium and before filling the system with the heat-transfer medium according to an embodiment of the present invention. The method for filling the system with the heat-transfer medium is not particularly limited, and the filling may be carried out using the pressure difference between the heat-transfer medium and the organic Rankine cycle system or mechanical power of a pump or the like.

The dynamic heat-transfer medium according to an embodiment of the present invention is nonflammable, and in addition, the environmental influence is extremely small compared with 2,2-dichloro-1,1,1-trifluoroethane (HCFC-12 3) which is a commonly used environmentally hazardous working medium. Moreover, the heat-transfer medium according to an embodiment of the present invention has excellent heat transfer and thermal energy conversion properties, making it suitable for use in organic Rankine cycle systems.

For example, as the indexes for evaluating performance of a working medium used in an organic Ranking cycle system, the power generation cycle efficiency ($\eta$-cycle) and the expander size parameter (SP) are represented.

The power generation cycle efficiency ($\eta$-cycle) is a generally accepted measure of the working medium performance and is particularly useful for expressing the relative thermodynamic efficiency of the working medium in a Rankine cycle. The ratio of electrical energy produced by the working medium in the expander and the generator to the thermal energy supplied from the heating source when the working medium is evaporated is expressed as the $\eta$-cycle.

The expander size parameter (SP) is a measure for evaluating the size of an expander and is commonly accepted (Energy 2012, Vol. 38, pp. 136-143). When replacing a working medium in a Rankine cycle under identical conditions, a higher SP value means that the working medium requires a larger size expander. In other words, a decrease in the SP value allows the use of a smaller size expander, which is preferred because of the contribution to the downsizing of the Rankine cycle system.

On the other hand, in general, a higher value of the power generation cycle efficiency results in a higher SP value, while a lower value of the power generation cycle efficiency results in a lower SP value. That is, there is a trade-off relationship between the value of the power generation cycle efficiency and the value of SP. In an organic Rankine cycle system, a high power generation cycle efficiency is desirable, and a low value of SP is desirable to satisfy the requirement for downsizing of the Rankine cycle system. It is difficult for a conventional working medium to satisfy these requirements within a practical range.

The heat-transfer medium according to an embodiment of the present invention is a novel heat-transfer medium which is capable of adjusting the value of the power generation cycle efficiency ($\eta$-cycle) and the value of the expander size parameter (SP) within a practical range.

Furthermore, the heat-transfer medium according to an embodiment of the present invention is capable of reducing the volume flow at the inlet and the volume flow at the outlet of the expander compared with those of commonly used 2,2-dichloro-1,1,1-trifluoroethane (HCFC-123) when generating the electrical energy of the same capacitance, which enables the system downsizing.

Third Embodiment

In this embodiment, a variety of applications of the azeotropic (like) composition described in the First Embodiment is explained.

1. Cleaning Agent

The azeotropic (like) composition of an embodiment of the present invention has excellent detergency. The fields of cleaning in which the azeotropic (like) composition are used is not particularly limited, and the fields in which CFC-113 (chlorotrifluoromethane), HCFC-141b (1,1-dichloro-1-fluoroethane), or HCFC-225 (a mixture of 3,3-dichloro-1,1,1,2,2-pentafluoropropane (HCFC-225ca) and 1,3-dichloro-1,1,2,2,3-pentafluoropropane (HCFC-225cb)) has been used as a cleaning agent is suitable. Specifically, the cleaning of electronic parts (printed circuit boards, liquid crystal displays, magnetic recording parts, semiconductor materials, and the like), electrical parts, precision machine parts, resin-processing parts, optical lenses, clothing, and the like and the cleaning of a variety of cars, vehicles, and transportation systems such as automobiles, motorcycles, bicycles, construction machinery, agricultural machinery, aircraft, railroad vehicles, and ships (especially parts cleaning and brake cleaning thereof) are represented. The types of stains are also not limited, and the stains which can be removed by CFC-113, HCFC-141b, or HCFC-225 can be removed by optimizing the composition ratio of the present azeotropic (like) composition. As such stains, particles, oil, grease, wax, flux, ink, and the like are represented.

Cleaning methods are not particularly limited, and conventionally used methods can be employed. Specifically, immersion, spraying, boiling cleaning, ultrasonic cleaning, steam cleaning, or a combination thereof can be represented. Among them, the method of removing stains by immersion is particularly preferred. Here, immersion refers to bringing an object (an object to be cleaned) to which stains such as oil are attached into contact with the azeotropic (like) composition. The stains attached to the object to be cleaned can be dissolved in the azeotropic (like) composition, and the stains can be removed from the object to be cleaned by immersing the object to be cleaned in the azeotropic composition. Note that other cleaning operations (boiling cleaning, ultrasonic cleaning, and the like) can be combined with the immersion operation. In addition, spray cleaning exemplified by a method in which the present azeotropic (like) composition is mixed with an injection gas to form an aerosol and then sprayed onto a variety of articles to be cleaned is another preferred embodiment.

In order to further improve the detergency, interfacial action, and the like, a variety of surfactants may be added to the cleaning agent containing the present azeotropic (like) composition, as necessary. As the surfactants, nonionic surfactants exemplified by sorbitan aliphatic esters such as sorbitan monooleate and sorbitan trioleate; polyoxyethylene sorbitol aliphatic acid esters such as polyoxyethylene sorbitol tetraoleate; polyethylene glycol aliphatic acid esters such as polyoxyethylene monolaurate; polyoxyethylene alkyl ethers such as polyoxyethylene lauryl ether; polyoxyethylene alkyl phenyl ethers such as polyoxyethylene nonylphenyl ether; and polyoxyethylene alkylamine aliphatic acid amides such as polyoxyethylene oleamide are represented. These surfactants may be used singly or in combination of two or more kinds thereof. For the purpose of synergistically improving detergency and interfacial action, cationic surfactants or anionic surfactants may be added to the cleaning agent containing the present azeotropic (like) composition in addition to these nonionic surfactants. The amount of surfactant used depends on the type of surfactant and may be to the extent which does not influence the properties of the azeotropic (like) composition. Usually, the amount is approximately equal to or more than 0.1 mass % and equal to or less than mass % in the azeotropic (like) composition and is preferred to be approximately equal to or more than 0.3 mass % and equal to or less than 5 mass %.

A variety of stabilizers may be further added to the cleaning agent containing the present azeotropic (like) composition when used under severe conditions. The type of stabilizer is not particularly limited, and the stabilizers which are azeotropic or form an azeotropic-like mixture in distillation operations are more preferred. As the specific examples of such stabilizers, aliphatic nitro compounds such as nitromethane, nitroethane, and nitropropane; aromatic nitro compounds such as nitrobenzene, nitrotoluene, nitrostyrene, and nitroaniline; ethers such as dimethoxymethane, 1,2-dimethoxyethane, 1,4-dioxane, 1,3,5-trioxane, and tetrahydrofuran; epoxides such as glycidol, methyl glycidyl ether, allyl glycidyl ether, 1,2-butylene oxide, phenyl glycidyl ether, cyclohexene oxide, and epichlorohydrin; unsaturated hydrocarbons such as hexene, heptene, pentadiene, cyclopentene, and cyclohexene; olefinic alcohols such as allyl alcohol and 1-butene-3-ol; acetylenic alcohols such as 3-methyl-1-butin-3-ol and 3-methyl-1-pentin-3-ol; and acrylic esters such as methyl acrylate, ethyl acrylate, butyl acrylate, and vinyl methacrylate are represented. Furthermore, phenols, amines, or benzotriazoles may also be used in combination to obtain more synergistic stabilizing effects. These stabilizers may be used singly or in combination of two or more thereof. The amount of stabilizer used depends on the type of stabilizer and may be to the extent which does not influence the properties of the azeotropic (like) composition. Usually, the amount is approximately equal to or more than 0.01 mass % and equal to or less than 10 mass % in the azeotropic (like) composition and is preferred to be approximately equal to or more than 0.1 mass % and equal to or less than 5 mass %.

Since the liquid phase composition ratio and the gas phase composition ratio of the present azeotropic (like) composition are substantially the same in the vapor-liquid equilibrium, the composition change is extremely small, and stable cleaning ability can always be obtained even if volatilization occurs over time. In addition, compositional changes in the storage container during storage can also be avoided.

A variety of solvents may be added to the cleaning agent containing the present azeotropic (like) composition if necessary. As the solvents, water, hydrocarbons, alcohols, ketones, ethers, esters, chlorocarbons, hydrofluorocarbons (HFC), hydrofluoroethers (HFE), hydrochlorofluoroolefins (HCFO) (except for trans-1-chloro-3,3,3-tetrafluoropropene and 1-chloro-1,3,3,3-tetrafluoropropene), hydrofluoroolefins (HFO), and the like are represented. The addition amount of these solvents is preferred to be equal to or less than 50 mass %, more preferred to be equal to or less than 40 mass %, further preferred to be equal to or less than 20 mass %, and particularly preferred to be equal to or less than 10 mass % with respect to the azeotropic (like) composition.

2. Foaming Agent

The case in which the present azeotropic (like) composition is used as a foaming agent is described in detail.

Currently, trans-1-chloro-3,3,3-trifluoropropene is commercially produced as a foaming agent, and formulations optimized for trans-1-chloro-3,3,3-trifluoropropene have been proposed. The addition of 1-chloro-1,3,3,3-tetrafluoropropene to the formulation improves the thermal insulation properties of rigid polyurethane foam without any large formulation change.

The present azeotropic (like) composition containing 1-chloro-1,3,3,3-tetrafluoropropene and 1-chloro-3,3,3-trifluoropropene can be used as a foaming agent used for producing rigid polyurethane foam or polyisocyanurate foam. A premix is required for the production of rigid polyurethane foam or polyisocyanurate foam, and the premix is a mixture of a foaming agent, one or more kinds of polyol, a catalyst, a foam stabilizer, a flame retardant, water, and the like. By using the azeotropic (like) composition according to the present invention as the foaming agent in this premix to react with isocyanates, the object, rigid polyurethane foam or polyisocyanurate foam, can be produced. Of course, a mixture in which the above-mentioned substances are mixed with the present azeotropic (like) composition is also within the technical scope of the present invention.

Isocyanates includes aromatic, cycloaliphatic, and chain-aliphatic isocyanates and the like, and bifunctional isocyanates are generally used. As such isocyanates, polyisocyanates such as tolylene diisocyanate, diphenylmethane diisocyanate, polymethylene polyphenyl polyisocyanate, tolylene diisocyanate, naphthalene diisocyanate, hexamethylene diisocyanate, isophorone diisocyanate, xylene diisocyanate, hydrogenated xylylene diisocyanate, and dicyclohexylmethane isocyanate as well as their prepolymer-type modified forms, nurate-modified forms, and urea-modified forms are represented, for example. These isocyanates are used singly or as a mixture.

As the polyols included in the premix, a polyether-based polyol, a polyester-based polyol, a multivalent alcohol, a diethylene-based polymer containing hydroxyl groups, and the like are represented, and a polyether-based polyol is generally used. Moreover, a polyester-based polyol and a polyether-based polyol may be used as a main component, and other polyols may also be used.

As the polyester-based polyols, a condensed polyester polyol, a lactone-based polyester polyol, a polycarbonate polyol, and the like are represented in addition to phthalic anhydride, waste polyester, and a compound derived from castor oil.

From the viewpoint of compatibility with foaming agents, additives, or the like as well as foaming and foam properties, the hydroxyl group value (OH value) of the polyester polyol is preferred to be equal to or more than 100 mgKOH/g and equal to or less than 400 mgKOH/g, and viscosity is preferred to be equal to or more than 200 mPa·s/25° C. and equal to or less than 4000 mPa·s/25° C.

As the polyether-based polyols, an adduct of a cyclic ether such as propylene oxide, ethylene oxide, epichlorohydrin, and butylene oxide with a compound including active hydrogen such as sugar, a multivalent alcohol, and an alkanolamine as an initiator are preferably used in addition to polypropylene glycol, polytetramethylene glycol, and their modified forms.

The polyether polyols having a hydroxyl group value equal to or more than 400 mgKOH/g and equal to or less than 1000 mgKOH/g are usually used.

An organometal-based catalyst and an organoamine-based catalyst are included in the catalyst contained in the premix. As an organometal-based catalyst, an organotin compound is preferably used, and stannous octoate, stannous laurate, dibutyl tin dilaurate, dibutyl tin dimarate, dibutyl tin diacetate, dioctyl tin diacetate, and the like are represented. As an organoamine catalyst, tertiary amines such as triethylenediamine, N-ethylmorpholine, bis(2-dimethylaminoethyl) ether, and N,N',N'-triethylethanolamine are represented, for example.

An organosilicon compound-based surfactant is usually used as the foam stabilizer included in the premix, and SH-193, SH-195, SH-200, SRX-253, and the like manufactured by Toray Silicone Co., LTD, F-230, F-305, F-341, F-348, and the like manufactured by Shin-Etsu Silicone Co., LTD, L-544, L-5310, L-5320, L-5420, and L-5720 manufactured by Nippon Unicar Co., LTD, or TFA-4200, TFA-4202, and the like manufactured by Toshiba Silicones Co. LTD are represented.

As the flame retardant included in the premix, tris(2-chloroethyl)phosphate, tri(2-chloropropyl) phosphate, tri(butoxyethyl) phosphate, trimethyl phosphate, triethyl phosphate, triphenyl phosphate, tri(isopropylphenyl) phosphate, and the like, which are phosphates used in rigid polyurethane foam or polyisocyanurate foam, are represented.

As another additive added to the premix, an UV inhibitor, an anti-scorch agent, a premix storage stabilizer, and the like, which are additives to improve the properties of rigid polyurethane foam or polyisocyanurate foam, are represented.

The addition of water reduces the amount of fluorine-based foaming agent to be used, which contributes to the economic efficiency of rigid polyurethane foam or polyisocyanurate foam and to the reduction of the vapor pressure of the premix. When the premix is added with water and is further added with a polyester-based polyol to be subjected to storage, it is preferred to add a stabilizer exemplified by an epoxy compound such as 1,2-epoxybutane, 1,2-epoxy-hexane, and epoxycyclohexane, an unsaturated compound such as a-methylstyrene, p-isopropenyltoluene, and amylene, a nitro compound such as nitromethane, nitroethane, nitropropane, nitrotoluene, and nitrobenzene, or the like to the premix.

When the azeotropic (like) composition according to an embodiment of the present invention is used as a foaming agent, it is used so that the amount of the foaming agent is usually equal to or more than 5 mass parts and equal to or less than 80 mass parts, preferably equal to or more than 10 mass parts and equal to or less than 70 mass parts, and more preferably equal to or more than 15 mass parts and equal to or less than 60 mass parts per 100 mass parts of the polyol. By using such an amount of the azeotropic (like) composition as the foaming agent, rigid polyurethane foam or polyisocyanurate foam having a density equal to or higher than 20 kg/m$^3$, in particular, equal to or higher than 30 kg/m$^3$ and equal to or lower than 80 kg/m$^3$ can be manufactured.

Moreover, when these raw materials are mixed, they immediately react to generate reaction heat and foam. The mixing temperature is preferred to be equal to or higher than 5° C. and equal to or lower than 50° C., equal to or higher than 10° C. and equal to or lower than 40° C., or equal to or higher than 15° C. and equal to or lower than 35° C. Since the present azeotropic (like) composition has a vapor pressure, it volatilizes at this temperature. However, since the compositions of the gas and liquid phases are substantially the same, the azeotropic (like) composition is excellent in foamability, heat insulation, shape stability at a low temperature, and the like.

The method of manufacturing rigid polyurethane foam or polyisocyanurate foam using the azeotropic (like) composition according to an embodiment of the present invention is not particularly limited, and a variety of conventionally known methods can be employed. For example, it can be manufactured by the one-shot method or the prepolymer method. In addition, a variety of foaming methods such as on-site foaming, slab foaming, injection foaming (filling method, mold method), lamination foaming, and spray foaming can be employed as the foaming method to obtain the foam.

3. Silicone Solvent

The azeotropic (like) composition according to an embodiment of the present invention has extremely excellent characteristics as a solvent for silicone. That is, the present azeotropic (like) composition has virtually zero ozone depletion potential and global warming potential, is nonflammable, has excellent volatility, and can dissolve various types of silicone in an arbitral ratio. In particular, since the present azeotropic (like) composition has a wide azeotropic-like composition range, the optimal composition can be selected for a variety of silicone compounds.

An example where the excellent effects of using the present azeotropic (like) composition as a silicone solvent are realized is represented by surface coating. In surface coating, in order to protect a surface of an object and provide lubricity, it is common to apply a silicone coating solution obtained by dissolving the lubricant silicone in a volatile solvent onto the object and then evaporate the solvent. For example, injection needles are coated with silicone to improve their sliding properties. By mixing the azeotropic (like) composition according to an embodiment of the present invention with silicone, it can be used as a silicone coating solution.

As a silicone that can be used, a variety of silicones used for surface coating can be used, for example, but the silicone is not limited thereto, and one type or a mixture of two or more types may be used. Among them, silicones such as a straight silicone oil bounded with methyl groups, phenyl groups, or hydrogen as substituents, such as dimethyl silicone oil, methyl phenyl silicone oil, and methyl hydrogen silicone oil, a modified silicone oil having a constituent part secondarily derived from a straight silicone oil, as a reactive silicon oil and a non-reactive silicon oil may be used. As a reactive silicone oil, an amino-modified form, a diamino-modified form, an epoxy-modified form, a carboxy-modified form, a carbinol-modified form, a methacryl-modified form, a phenolic-modified form, a heterofunctional group-modified form, and the like are represented, while a polyether-modified form, a methylstyryl-modified form, an alkyl-modified form, a higher aliphatic acid ester-modified form, a hydrophilic special form, a fluorine-modified form, and the like are represented as a non-reactive silicone, for example.

As a specific silicone, those mainly composed of a copolymer of a aminoalkylsiloxane and dimethylsiloxane, those mainly composed of a reaction product of an amino group-containing silane and an epoxy group-containing silane and a reaction product with a polydiorganosiloxane containing silanol groups, a silicone mixture consisting of a silicone containing amino groups in the side chain or at the terminal and a polydiorganosiloxane, and a non-reactive silicone, and a mixture of silicone, which is obtained by reacting an amino group-containing alkoxysilane, an epoxy group-containing alkoxysilane, and a silicone having silanol groups at both terminals are represented, but the silicone is not limited thereto.

The proportion of the present azeotropic (like) composition serving as a silicone solvent in the silicone solution for coating is preferably equal to or more than 0.1 mass % and equal to or less than 80 mass % or equal to or more than 1 mass % and equal to or less than 20 mass %. By satisfying the above proportion, a coating film with a sufficient thickness can be formed at a uniform thickness.

A silicone coating film is formed on a surface of an object by applying a silicone coating solution containing the present azeotropic (like) composition onto the surface of the object and evaporatively removing the azeotropic (like) composition. The object to which the method according to the present embodiment can be applied may include a variety of materials such as a metal material, a resin material, a ceramic material, and a glass material, and the like, and the method can be particularly applied to a needle tube part of a syringe needle, a spring, a spring part, or the like of a dispenser (liquid metering spray device), and the like.

For example, in the case of forming a silicone film on a needle tube part of a syringe needle, a dip-coating method can be applied as the method of applying silicone to the needle tube part of the syringe needle, in which the needle tube part of the syringe needle is dipped in a silicone coating solution to apply it onto the outer surface of the needle tube part, and then left at room temperature or under heating to vaporize the solvent composition including the present azeotropic (like) composition.

The azeotropic (like) composition according to an embodiment of the present invention is also useful as a solvent for a lubricant other than silicone. As a lubricant other than silicone, a mineral oil-based lubricant, a synthetic oil-based lubricant, a fluorine-based lubricant, and the like are represented. Among them, a fluorine-based lubricant is preferred because of their excellent solubility or dispersibility. A fluorine-based lubricant refers to a lubricant having fluorine atoms in its molecule and is exemplified by, but not limited to, a fluorinated oil, a fluorinated grease, a fluorine-based solid lubricant such as polytetrafluoroethylene. The azeotropic (like) composition according to an embodiment of the present invention is also suitable as a solvent for forming a lubricant coating film on articles because of its sufficient quick-drying properties.

4. Aerosol Composition

The azeotropic (like) composition according to an embodiment of the present invention can be used in the form of an aerosol composition because of nonflammability. An injector may be filled with the azeotrope (like) composition at a high pressure, and the azeotrope (like) composition can be injected from the injector. At this time, a coating film-forming composition can be applied to surfaces of a variety of articles by mixing the coating film-forming composition with the azeotropic (like) composition.

When the present azeotropic (like) composition is used as an aerosol composition, a pressure booster may be further included. As a pressure booster, those having small pressure fluctuations during use of the injector and capable of being uniformly injected onto a coating object without irregularity are preferred. As a specific pressure booster, 1,3,3,3-tetrafluoropropene (1234ze), 1,2,2,2-tetrafluoroethane (134a), 2,3,3,3-tetrafluoropropene (1234yf), dimethyl ether, carbon dioxide, methane, ethane, propane, isobutane, and the like are represented. The pressure booster may be used in the state of compressed gas or in the state of liquefied gas. By using the present azeotropic (like) composition as an aerosol composition, the amount of solvent composition used can be reduced compared with the method of applying the coating film-forming composition by dipping.

5. Fire Extinguishing Agent

Trans-1-chloro-3,3,3-trifluoropropene and 1-chloro-1,3,3,3-tetrafluoropropene included in the present azeotropic (like) composition each have relatively low vapor pressure and include halogens which inhibit flammability and carbon-carbon double bonds which are readily decomposed by OH radicals. Therefore, they can be used as fire extinguishing agents. When the present azeotropic (like) composition is used as a fire extinguishing agent, a nonflammable compound may be further added. As a nonflammable compound, nitrogen, carbon dioxide, an inert gas, or a nonflammable fluorine-containing compound is represented. As a nonflammable fluorine-containing compound, a fluoroalkane, a fluoroalkene, a fluoroketone, a fluoroether, and the like are represented.

As the fluoroalkanes, trifluoromethane (HFC-23), 1,1,2,2-tetrafluoroethane (HFC-134), 1,1,1,2-tetrafluoroethane (HFC-134a), trifluoromethane iodide (CF3), 1,1-dichloro-2,2,2-trifluoroethane (HCFC-124), pentafluoroethane (HFC-125), 1,1,1,2,3,3-hexafluoropropane (HFC-236ea), 1,1,1,3,3,3-hexafluoropropane (HFC-236fa), 1,1,1,2,3,3,3-heptafluoropropane (HFC227ea), 1,1,1,2,2,3,3-heptafluoropropane (HFC-227ca), and the like are represented.

As the fluoroalkenes, trans-1,3,3,3-tetrafluoropropene (1234ze(E)), cis-1,3,3,3-tetrafluoropropene (1234ze(Z)), cis-1,1,1,4,4,4-hexafluoro-2-butene (1336mzz(Z)), trans-1,1,1,4,4,4-hexafluoro-2-butene (1336mzz(E), cis-1-chloro-3,3,3-trifluoropropene (1233zd(Z)), trans-1-chloro-2,3,3,3-tetrafluoropropene (1224yd(E)), 2-bromo-3,3,3-trifluoropropene (2-BTP), 1-bromo-3,3,3-trifluoropropene (1-BTP), and the like are represented.

As the fluoroketones, dodecafluoro-2-methylpentan-3-one, tetradecafluoro-2,4-dimethylpentan-3-one, tetradecafluoro-2-methylhexan-3-one, and the like are represented.

As the fluoroethers, pentafluoroethyl methyl ether (HFE-245mc), 1,1,2,2-tetrafluoroethyl methyl ether (HFE-254pc), heptafluoroisopropyl methyl ether (HFE-347mmy), heptafluoropropyl methyl ether (HFE-347mcc), 1,1,2,2-tetrafluoroethyl-2,2,2-trifluoroethyl ether (HFE-347pc-f), and the like are represented.

In addition, the fire extinguishing agent containing the present azeotropic (like) composition may contain a stabilizer. As the stabilizer, an oxidation resistance and a heat resistance improver such as a phenol-based compound, an aromatic compound containing a unsaturated hydrocarbon group, an aromatic amine compound, an aromatic thiazine compound, a terpene compound, a quinone compound, a nitro compound, an epoxy compound, a lactone compound, an orthoester compound, a mono- or dialkal metal halide of phthalic acid, and thiodiphenyl ether hydroxide, a nitrogen-containing heterocyclic compound such as an imidazole compound, a thiazole compound, and a triazole compound, and a metal inactivator such as an alkyl acid phosphate or its derivative are represented.

6. Fumigant

Since 1-chloro-1,3,3,3-tetrafluoropropene included in the present azeotropic (like) composition is a colorless liquid, nonflammable, and has high fumigant activity, it can be used as a fumigant. Therefore, by filling a sprayer with the present azeotropic (like) composition and injecting the azeotropic (like) composition against pests, pests can be effectively exterminated.

When filling the sprayer with the present azeotropic (like) composition, a pressure booster may be added to increase the pressure in the sprayer. As the boosting agent, liquefied petroleum gas (LPG) such as propane, propylene, n-butane, and isobutane, an ether such as dimethyl ether, carbon dioxide, nitrogen, compressed gas such as compressed air, 1,1-difluoroethane (HFC-152a), 1,1,1,2-tetrafluoroethane (HFC134a), 2,3,3,3-tetrafluoro-1-propene (HFO-1234yf), trans-1,3,3,3-tetrafluoropropene (HFO-1234ze) and the like are represented.

When the present azeotropic (like) composition is used as a fumigant, water, alcohols such as isopropyl alcohol and ethanol, glycols such as propylene glycol and ethylene glycol, a paraffin-based hydrocarbon such as isoparaffin and normal paraffin, petroleum such as a naphthene-based hydrocarbon and kerosene, a solvent of an ester or the like such as isopropyl myristate and hexyl laurate, a lactate, an alkyl pyrrolidone, poly(vinyl pyrrolidone), a carbonate, a dissolution aid such as a non-ionic surfactant, a cationic surfactant, an anionic surfactant, and an amphoteric surfactant, or the like may be added as another ingredient.

In addition, an additive such as a fungicide, an antiseptic, a co-potentiator, a deodorant, an aromatic agent, an insecticide, and a repellent may be used. As a fungicide and an antiseptic, a phenol-based compound such as chloroxylenol, 3-methyl-4-isopropylphenol, and thymol; a quaternary ammonium compound such as benzalkonium chloride and cetylpyridinium chloride; 3-iodo-2-propynylbutylcarbamate, phenoxyethanol, triclosan, N-dichlorofluoromethylthio-N',N'-dimethyl-N-phenylsulfamide, and the like are represented, for example.

As a deodorant, a plant extract such as tea extract, catechin, and a plant polyphenol; and lauryl methacrylate, geranyl crotonate, acetophenone myristylate, para-methylacetophenone benzaldehyde, and the like are represented, for example As an aromatic agent, a natural fragrance such as jicama, bergamot oil, cinnamon oil, citronella oil, lemon oil, and lemongrass oil; and an artificial fragrance such as pinene, limonene, linalool, menthol, borneol, eugenol, citral, citronellal, and geraniol are represented, for example.

As a co-potentiator, piperonyl butoxide, octachlorodipropyl ether, N-(2-ethylhexyl)bicyclo[2.2.1]hept-5-ene-2,3-dicarboximide, and the like are represented, for example.

As an insecticide and a repellent, a pyrethroid-based compound such as natural pyrethrins, allethrin, resmethrin, flamethrin, prallethrin, terarethrin, phthalthrin, phenothrin, permethrin, cyphenothrin, transfluthrin, metofluthrin, profluthrin, emphenthrin, imiprothrin, and etofenprox; a carbamate-based compound such as propoxur and carbaryl; an organophosphorus-based compound such as fenitrothion and DDVP; an oxadiazole-based compound such as metoxadiazone; a neonicotinoid-based compound such as dinotefuran, imidacloprid, and acetamiprid; an insect growth regulator such as methoprene, hydroprene, and pyriproxyfen; a phenylpyrazole-based compound such as fipronil and pyriprole; a pyrrole-based compound such as chlorfenapyr; a sulfonamide-based compound such as amidoflumet; and an insecticidal and repellent essential oil such as phytoncide, hackberry oil, orange oil, cinnamon oil, and clove oil, and the like are represented, for example,

EXAMPLES

1. Vapor-Liquid Equilibrium Measurement

Hereinafter, an example for conducting a vapor-liquid equilibrium measurement of a composition including trans-1-chloro-3,3,3-trifluoropropene and cis-1-chloro-1,3,3,3-tetrafluoropropene and a composition including trans-1-chloro-3,3,3-tetrafluoropropene, cis-1-chloro-1,3,3,3-tetrafluoropropene, and trans-1-chloro-1,3,3,3-tetrafluoropropene is described.

1-1. Example 1: Mixed Solution of Trans-1-chloro-3,3,3-trifluoropropene and Cis-1-chloro-1,3,3,3-tetrafluoropropene Each of mixed solutions (230 g) of trans-1-chloro-3,3,3-trifluoropropene and cis-1-chloro-1,3,3,3-tetrafluoropropene with different composition ratios of trans-1-chloro-3,3,3-trifluoropropene and cis-1-chloro-1,3,3,3-tetrafluoropropene was fed into an Othmer-type gas-liquid equilibrium distillation apparatus, and the vapor phase composition and the liquid phase composition were determined by a gas chromatography analysis when an equilibrium was reached. The results are shown in Table 1.

TABLE 1

| | Compositions of gas phase and liquid phase of mixed solvent of Example 1 | | | |
|---|---|---|---|---|
| | Composition of liquid phase portion (mol %) | | Composition of gas phase portion (mol %) | |
| Examples | trans-1-chloro-3,3,3-trifluoropropene | 1-chloro-1,3,3,3-tetrafluoropropene | trans-1-chloro-3,3,3-trifluoropropene | 1-chloro-1,3,3,3-tetrafluoropropene |
| 1-1 | 99.84 | 0.16 | 99.85 | 0.15 |
| 1-2 | 99.17 | 0.83 | 99.13 | 0.87 |
| 1-3 | 90.99 | 9.01 | 90.65 | 9.35 |

As shown in Table 1, it can be understood that the mixed solution of trans-1-chloro-3,3,3-trifluoropropene and cis-1-chloro-1,3,3,3-tetrafluoropropene forms an azeotropic (like) composition.

1-2. Example 2: Mixed Solution of Trans-1-chloro-3,3,3-trifluoropropene, Cis-1-chloro-1,3,3,3-tetrafluoropropene, and Trans-1-chloro-1,3,3,3-tetrafluoropropene The same operations were conducted as Example 1 other than that a mixed solution of cis-1-chloro-1,3,3,3-tetrafluoropropene and trans-1-chloro-1,3,3,3-tetrafluoropropene was used instead of cis-1-chloro-1,3,3,3-tetrafluoropropene. The gas phase composition and the liquid phase composition were determined by gas chromatography when equilibrium was reached. A solution of cis-1-chloro-1,3,3,3-tetrafluoropropene/trans-1-chloro-1,3,3,3-tetrafluoropropene=35.6/64.4 was prepared in Examples 2-1 to 2-5, while a solution of cis-1-chloro-1,3,3,3-tetrafluoropropene/trans-1-chloro-1,3,3,3-tetrafluoropropene=80.3/19.7 was prepared in Examples 2-6 to 2-10, and the measurement samples were prepared by mixing with trans-1-chloro-3,3,3-trifluoropropene. The measurement results are shown in Table 2.

heat-transfer medium in a condenser with respect to the amount of work applied by the compressor in compressing the vapor is expressed as $COP_H$.

The volumetric capacity of the heat-transfer medium represents the amount of heat of cooling or heating provided by the heat-transfer medium per unit suction volume of the compressor. That is, for a specific compressor, the heat-transfer medium can absorb or release a larger amount of heat with increasing volumetric capacity of the heat-transfer medium.

Specific calculation results will be discussed below. In order to evaluate the performance of the refrigeration cycle system and the high-temperature heat pump cycle system using the azeotropic (like) composition containing trans-1-chloro-3,3,3-trifluoropropene and cis-1-chloro-1,3,3,3-tetrafluoropropene or the azeotropic (like) composition containing trans-1-chloro-3,3,3-trifluoropropene, cis-1-chloro-1,3,3,3-tetrafluoropropene, and trans-1-chloro-1,3,3,3-tetrafluoropropene as the heat-transfer medium, the coefficients of performance ($COP_R$, $COP_H$) were calculated under the conditions shown in Table 3 and Table 6. The values of the physical properties of the heat-transfer medium were obtained using the REFPROP ver. 10.0 of the U.S. National Institute of Standards and Technology (NIST).

TABLE 2

Compositions of gas phase and liquid phase of mixed solvent of Example 2

| | Composition of liquid phase portion (mol %) | | | Composition of gas phase portion (mol %) | | |
|---|---|---|---|---|---|---|
| Examples | trans-1-chloro-3,3,3-trifluoropropene | cis-1-chloro-1,3,3,3-tetrafluoropropene | trans-1-chloro-1,3,3,3-tetrafluoropropene | trans-1-chloro-3,3,3-trifluoropropene | cis-1-chloro-1,3,3,3-tetrafluoropropene | trans-1-chloro-1,3,3,3-tetrafluoropropene |
| 2-1 | 12.13 | 6.76 | 81.11 | 14.04 | 6.75 | 79.21 |
| 2-2 | 8.81 | 4.97 | 86.22 | 10.52 | 5.08 | 84.4 |
| 2-3 | 6.06 | 3.44 | 90.5 | 6.88 | 3.35 | 89.77 |
| 2-4 | 2.82 | 1.6 | 95.58 | 3.41 | 1.66 | 94.93 |
| 2-5 | 0.55 | 0.3 | 99.15 | 0.66 | 0.31 | 99.03 |
| 2-6 | 3.7 | 15.01 | 81.29 | 4.4 | 15.22 | 80.38 |
| 2-7 | 2.73 | 11.26 | 86.01 | 3.27 | 11.49 | 85.24 |
| 2-8 | 1.79 | 7.5 | 90.71 | 2.16 | 7.73 | 90.11 |
| 2-9 | 0.86 | 3.74 | 95.4 | 1.06 | 3.91 | 95.03 |
| 2-10 | 0.15 | 0.72 | 99.13 | 0.19 | 0.76 | 99.05 |

As shown in Table 2, it can be understood that a mixed solution of trans-1-chloro-3,3,3-trifluoropropene, cis-1-chloro-1,3,3,3-tetrafluoropropene, and trans-1-chloro-1,3,3,3-tetrafluoropropene forms an azeotropic (like) composition.

2. Calculations for Application to Heat-Transfer System

Hereinafter, the results of calculations for the use of the azeotropic (like) composition according to an embodiment of the present invention in a refrigeration cycle system and a high-temperature heat pump cycle system are demonstrated. Specifically, calculations were conducted for the coefficient of performance (COP) and volumetric capacity (CAP).

The coefficient of performance (COP) is a generally accepted measure of refrigerant performance and is particularly useful for expressing the relative thermodynamic efficiency of a heat-transfer medium in a specific heating or cooling cycle involving evaporation or condensation of the heat-transfer medium. The ratio of the amount of heat accepted by the heat-transfer medium from a medium to be cooled in an evaporator with respect to the amount of work applied by a compressor in compressing the vapor is expressed as $COP_R$. On the other hand, the ratio of the amount of heat released to a medium to be heated from the In calculating the coefficient of performance of the refrigeration cycle system ($COP_R$) and the coefficient of performance of the high-temperature heat pump cycle system ($COP_H$), the following items were assumed.

(A) The compression process of the compressor is assumed to be isentropic compression.

(B) The throttling expansion process in the expansion valve is assumed to be isenthalpic expansion.

(C) Heat loss and pressure loss in the pipes and the heat exchanger are ignored.

(D) Compressor efficiency η is assumed to be 0.7.

Hereinafter, the formula for calculating the coefficient of performance ($COP_R$) of the refrigeration cycle system is explained in detail. The amount of heat input to the evaporator, $Q_{EVA}$, is $$Q_{EVA} = G \times (h_1 - h_4) \quad (1)$$

and the heat dissipation in the condenser, $Q_{CON}$, is as follows.

$$Q_{CON} = G \times (h_2 - h_3) \quad (2)$$

However, when the enthalpy of the heat-transfer medium at the compressor outlet after isentropic compression is expressed by $h_{2th}$, the enthalpy $h_2$ of the heat-transfer medium at the compressor outlet after taking compressor efficiency into account is as follows.

$$h_2 = h_1 + (h_{2th} - h_1)/\eta \quad (3)$$

The amount of work W applied by the compressor in compressing the vapor of the heat-transfer medium is as follows.

$$W = G \times (h_2 - h_1) \quad (4)$$

The coefficient of performance ($COP_R$) of the refrigeration cycle system is as follows.

$$COP_R = Q_{EVA}/W = (h_1 - h_4)/((h_2 - h_1)) \quad (5)$$

Furthermore, the coefficient of performance ($COP_H$) of the high-temperature heat pump cycle system is as follows.

$$COP_H = Q_{CON}/W = (h_2 - h_3)/((h_2 - h_1)) \quad (6)$$

Next, the formula for calculating the volumetric capacity of the heat-transfer medium (CAP) is explained in detail. Since the vapor density of the heat-transfer medium at the compressor inlet is $\rho_2$ and the heat absorption in the evaporator is $Q_{EVA}$, the volumetric capacity of the heat-transfer medium ($CAP_R$) in the refrigeration cycle system is as follows.

$$CAP_R = \rho_2 \times Q_{EVA} = \rho_2 \times (h_1 - h_4) \quad (7)$$

In addition, the volumetric capacity of the heat-transfer medium ($CAP_H$) in the high-temperature heat pump cycle system is as follows.

$$CAP_H = \rho_2 \times Q_{CON} = \rho_2 \times (h_2 - h_3) \quad (8)$$

The refrigeration capacity ($Q_R$) of the refrigeration cycle system is $$Q_R = (h_1 - h_4) \times G$$

and the heating capacity ($Q_H$) of the high-temperature heat pump system is as follows.

$$Q_R = (h_2 - h_3) \times G$$

Note that, in the above formula (1) to (8), the means of the various symbols are as follows.

G: Circulating amount of the heat-transfer medium
W: Compression work
$Q_{EVA}$: Amount of heat input
$Q_{CON}$: Amount of heat dissipation
$COP_R$: Coefficient of performance (cooling)
$COP_H$: Coefficient of performance (heating)
$CAP_R$: Volumetric capacity (cooling)
$CAP_H$: Volumetric capacity (heating)
h: Specific enthalpy 2-1. Examples 3-1 to 3-3: Refrigeration Cycle System Using Azeotropic Composition Containing Trans-1-chloro-3,3,3-trifluoropropene and Cis-1-chloro-1,3,3,3-tetrafluoropropene as Heat-Transfer Medium The calculation conditions for the refrigeration cycle system are shown in Table 3. Under these calculation conditions, the coefficient of performance ($COP_R$), the refrigeration capacity ($Q_R$), and the volumetric capacity ($CAP_R$) of the refrigeration cycle system using the azeotropic compositions containing trans-1-chloro-3,3,3-trifluoropropene and cis-1-chloro-1,3,3,3-trifluoropropene at different composition ratios were calculated as the heat-transfer medium. Note that, it is assumed that chilled water of 7° C. is generated by heat exchange between the heat-transfer medium and the heat source water in the evaporator.

TABLE 3

| Calculation conditions for refrigeration cycle system | | | |
|---|---|---|---|
| Evaporation temperature | TEVA | 2 | (° C.) |
| Condensation temperature | TCON | 40 | (° C.) |
| Degree of superheating | $T_{sh}$ | 10 | (K) |
| Degree of supercooling | $T_{SC}$ | 10 | (K) |
| Compressor efficiency | η | 0.7 | (—) |

2-2. Comparative Example 1: Refrigeration Cycle System Using 2,2-Dichloro-1,1,1-trifluoroethane As a Comparative Example 1, evaluation of the performance of a refrigeration cycle system using 2,2-dichloro-1,1,1-trifluoroethane (hereafter, referred to as HCFC-123) as a heat-transfer medium instead of the azeotropic (like) composition consisting of trans-1-chloro-3,3,3-trifluoropropene and cis-1-chloro-1,3,3,3-tetrafluoropropene was conducted. Specifically, the coefficient of performance ($COP_R$), the refrigeration capacity (OR), and volumetric capacity ($CAP_R$) of the refrigeration cycle system were calculated under the conditions shown in Table 3. Note that HCFC-123 is nonflammable and has an allowable concentration of 10 ppm. HCFC-123 has a boiling point of 27.8° C. at atmospheric pressure, atmospheric lifetime of 1.3 years, the Global Warming Potential (GWP) of 77 (IPCC Fourth Assessment Report 2007), and the Ozone Depletion Potential (ODP) of 0.02.

The calculation results using the azeotropic (like) compositions including trans-1-chloro-1,3,3,3-trifluoropropene and cis-1-chloro-1,3,3,3-tetrafluoropropene at different mass ratios as the heat-transfer medium are shown as relative values in Table 4 when the coefficient of performance ($COP_R$), refrigeration capacity (OR), and volumetric capacity ($CAP_R$) of the refrigeration cycle system of HCFC-123 calculated under the calculation conditions of Table 3 are assumed to be 1.0.

Figure 3:
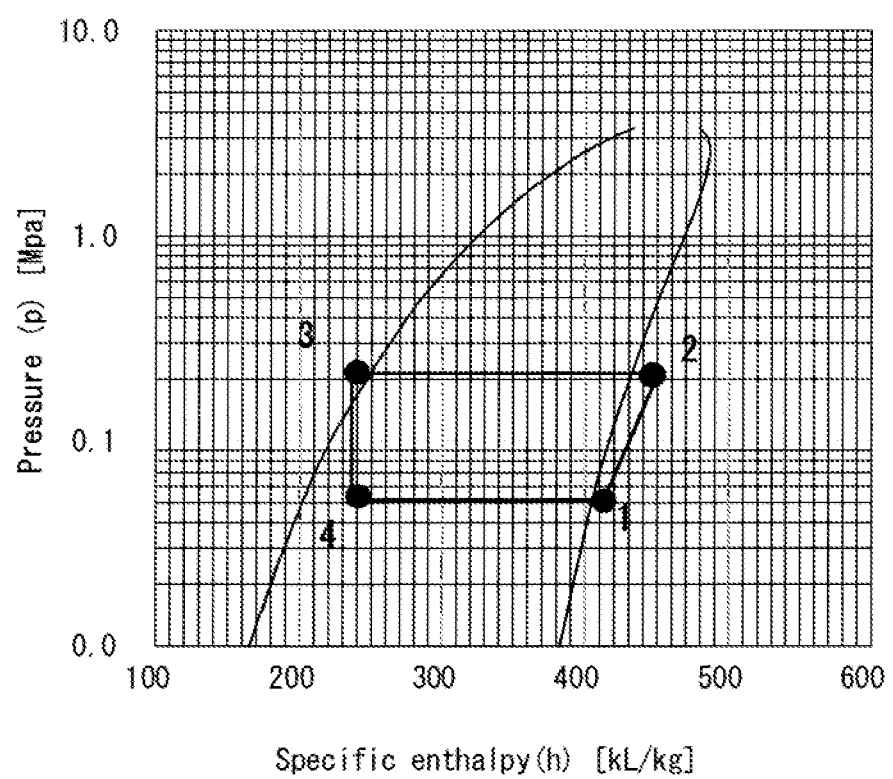
FIG. 3 is a Ph diagram in Example 3-1.

FIG. 3 shows the Ph diagram in Example 3-1. In FIG. 3, cycle points 1, 2, 3, and 4 indicate the refrigeration cycle system calculation conditions.

TABLE 4

Calculation results of refrigeration cycle system using azeotropic (like) composition including trans-1-chloro-3,3,3-trifluoropropene and cis-1-chloro-1,3,3,3-tetrafluoropropene

| | Refrigerant composition (mass %) | | Relative values (against R123) | | |
|---|---|---|---|---|---|
| Examples | trans-1-chloro-3,3,3-trifluoropropene | cis-1-chloro-1,3,3,3-tetrafluoropropene | Refrigeration capacity | $COP_R$ | $CAP_R$ |
| Example 3-1 | 99 | 1 | 1.1 | 1 | 1.4 |
| Example 3-2 | 95 | 5 | 1.1 | 1 | 1.3 |
| Example 3-3 | 90 | 10 | 1.1 | 0.9 | 1.2 |
| Comparable example 1 | — | — | 1 | 1 | 1 |

2-3. Examples 4-1 to 4-10: Refrigeration Cycle System Using Azeotropic (Like) Composition Including Trans-1-chloro-3,3,3-trifluoropropene, Cis-1-chloro-1,3,3,3-tetrafluoropropene, and Trans-1-chloro-1,3,3,3-tetrafluoropropene With respect to the evaluation of the performance of the refrigeration cycle system using trans-1-chloro-3,3,3-trifluoropropene, cis-1-chloro-1,3,3,3-tetrafluoropropene, and trans-1-chloro-1,3,3,3-tetrafluoropropene as the heat-transfer medium, the coefficient of performance ($COP_R$), the refrigeration capacity ($Q_R$), and the volumetric capacity ($CAP_R$) were calculated under the conditions shown in Table 3.

Figure 4:
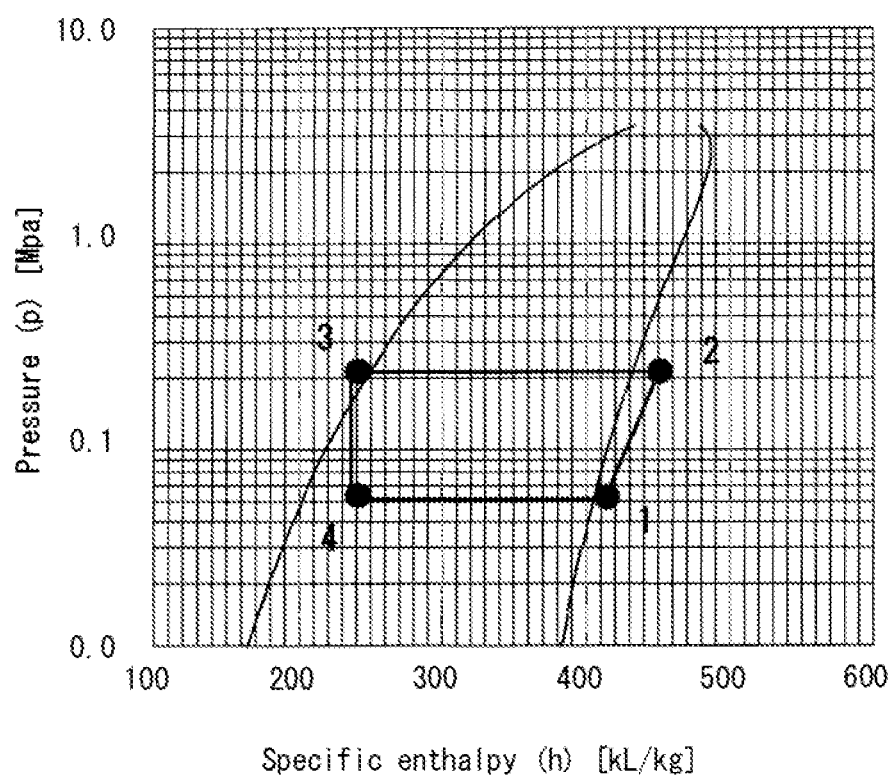
FIG. 4 is a Ph diagram in Example 4-10.

FIG. 4 shows the Ph diagram in Example 4-10. In FIG. 4, cycle points 1, 2, 3, and 4 indicate the refrigeration cycle system calculation conditions.

The calculation results using the azeotropic (like) compositions consisting of trans-1-chloro-1,3,3,3-trifluoropropene, cis-1-chloro-3,3,3-trifluoropropene and trans-1-chloro-1,3,3,3-tetrafluoropropene at different mass ratios as the heat-transfer medium are shown as relative values in Table 5 when the coefficient of performance ($COP_R$), refrigeration capacity ($Q_R$), and volumetric capacity ($CAP_R$) of the refrigeration cycle system of HCFC-123 calculated under the calculation conditions of Table 3 are assumed to be 1.0.

3,3,3-trifluoropropene and 1-chloro-1,3,3,3-tetrafluoropropene has a coefficient of performance ($COP_R$) in a refrigeration cycle system comparable to that of the conventionally used HCFC-123. Moreover, it was also proven that the volumetric capacity ($CAP_R$) is larger than that of HCFC-123. These results mean that, when designing a refrigeration cycle system with a cooling capacity equivalent to that of the refrigeration cycle system for HCFC-123, the overall system size can be reduced by using the azeotropic (like) compositions of an embodiment of the present invention. In addition, since the cooling capacity is larger than that of HCFC-123, it also means that the same cooling performance as that of HCFC-123 can be obtained by using a smaller amount of the present azeotropic (like) composition.

2-4. Examples 5-1 to 5-3: High-Temperature Heat Pump Cycle System Using Azeotropic (Like) Composition Consisting of Trans-1-chloro-3,3,3-trifluoropropene and Cis-1-chloro-1,3,3,3-tetrafluoropropene as Heat-Transfer Medium The calculation conditions for the high-temperature heat pump cycle system are shown in Table 6. Under these conditions, it is assumed that hot water of 80° C. is generated by heat exchange between the heat-transfer medium and the heat source water in the condenser. Under these conditions,

TABLE 5

Calculation results of refrigeration cycle system using azeotropic (like) composition including trans-1-chloro-3,3,3-trifluoropropene, cis-1-chloro-1,3,3,3-tetrafluoropropene, and trans-1-chloro-1,3,3,3-tetrafluoropropene

| | Refrigerant composition (mass %) | | | Relative values (against R123) | | |
|---|---|---|---|---|---|---|
| Examples | trans-1-chloro-3,3,3-trifluoropropene | cis-1-chloro-1,3,3,3-tetrafluoropropene | trans-1-chloro-1,3,3,3-tetrafluoropropene | Refrigeration capacity | $COP_R$ | $CAP_R$ |
| Example 4-1 | 80 | 8 | 12 | 1.1 | 1 | 1.2 |
| Example 4-2 | 85 | 6 | 9 | 1.1 | 1 | 1.3 |
| Example 4-3 | 90 | 4 | 6 | 1.1 | 1 | 1.3 |
| Example 4-4 | 95 | 2 | 3 | 1.1 | 1 | 1.4 |
| Example 4-5 | 99 | 0.4 | 0.6 | 1.1 | 1 | 1.4 |
| Example 4-6 | 80 | 16 | 4 | 1.1 | 0.9 | 1.1 |
| Example 4-7 | 85 | 12 | 3 | 1.1 | 0.9 | 1.2 |
| Example 4-8 | 90 | 8 | 2 | 1.1 | 0.9 | 1.2 |
| Example 4-9 | 95 | 4 | 1 | 1.1 | 1 | 1.3 |
| Example 4-10 | 99 | 0.8 | 0.2 | 1.1 | 1 | 1.4 |
| Comparable example 1 | — | — | — | 1 | 1 | 1 |

As shown in Table 4 and Table 5, it was found that the azeotropic (like) composition consisting of trans-1-chloroazeotropic (like) compositions consisting of trans-1-chloro-3,3,3-trifluoropropene and cis-1-chloro-1,3,3,3-tetrafluoropropene at different mass ratios were used as the heat-transfer medium, and the coefficient of performance ($COP_H$), the heating capacity ($Q_H$), and the volumetric capacity ($CAP_H$) of the high-temperature heat pump cycle system were calculated.

TABLE 6

Calculation conditions for high-temperature heat pump cycle system

| | | |
|---|---|---|
| Evaporation temperature | TEVA | 25 (° C.) |
| Condensation temperature | TCON | 85 (° C.) |
| Degree of superheating | $T_{sh}$ | 10 (K) |
| Degree of supercooling | $T_{SC}$ | 10 (K) |
| Compressor efficiency | η | 0.7 (—) |

2-5. Comparison Example 2: Refrigeration Cycle System Using HCFC-123

Similar to the Comparative Example 1, the coefficient of performance ($COP_H$), the refrigeration capacity, and the volumetric capacity ($CAP_H$) of the high-temperature heat pump cycle system were calculated under the conditions shown in Table 6 in the performance evaluation of the high-temperature heat pump cycle system using HCFC-123 as a heat-transfer medium instead of the azeotropic (like) composition consisting of trans-1-chloro-3,3,3-trifluoropropene and cis-1-chloro-1,3,3,3-tetrafluoropropene.

Figure 5:
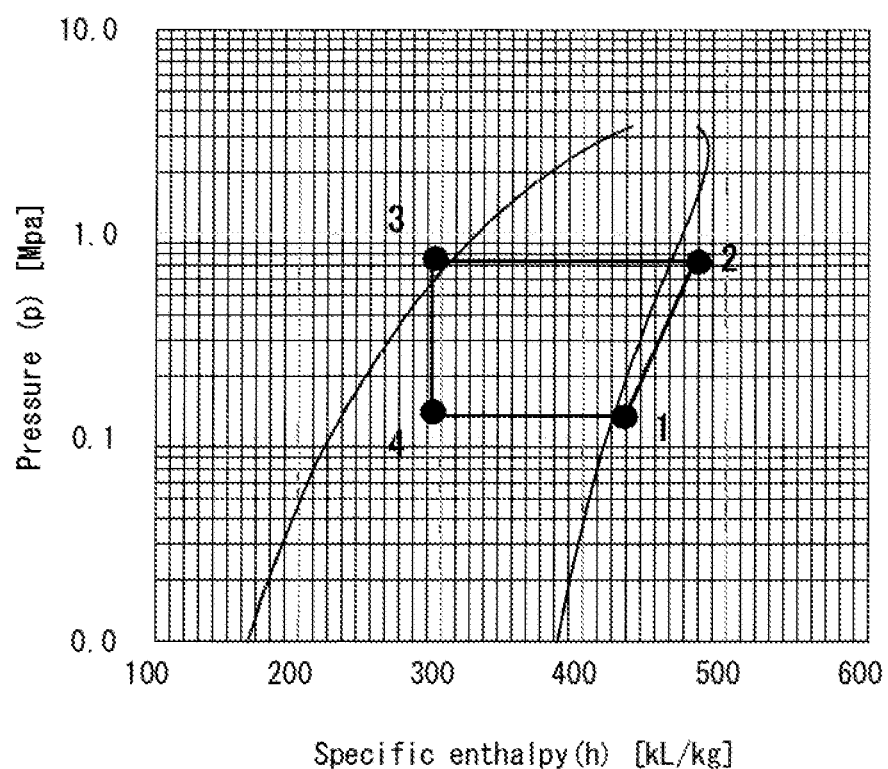
FIG. 5 is a Ph diagram in Example 5-1.

FIG. 5 shows the Ph diagram in Example 5-1. In FIG. 5, cycle points 1, 2, 3, and 4 indicate the high-temperature heat pump cycle system calculation conditions.

The calculation results using the azeotropic (like) compositions consisting of trans-1-chloro-3,3,3-trifluoropropene and cis-1-chloro-1,3,3,3-tetrafluoropropene at different mass ratios as the heat-transfer medium are shown as relative values in Table 7 when the coefficient of performance ($COP_R$), refrigeration capacity ($Q_R$), and volumetric capacity ($CAP_R$) of the high-temperature heat pump cycle system of HCFC-123 calculated under the calculation conditions of Table 6 are assumed to be 1.0.

TABLE 7

Calculation results of high-temperature heat pump cycle system using azeotropic (like) composition consisting of trans-1-chloro-3,3,3-trifluoropropene and cis-1-chloro-1,3,3,3-tetrafluoropropene

| | Refregerant composition (mass %) | | Relative values (against R123) | | |
|---|---|---|---|---|---|
| Examples | trans-1-chloro-3,3,3-trifluoropropene | cis-1-chloro-1,3,3,3-tetrafluoropropene | Heating capacity | $COP_H$ | $CAP_H$ |
| Example 5-1 | 99 | 1 | 1.1 | 1 | 1.3 |
| Example 5-2 | 95 | 5 | 1.1 | 1 | 1.3 |
| Example 5-3 | 90 | 10 | 1.1 | 1 | 1.2 |
| Comparable example 2 | — | — | 1 | 1 | 1 |

2-6. Examples 6-1 to 6-10: High-Temperature Heat Pump Cycle System Using Azeotropic (Like) Composition Containing Trans-1-chloro-3,3,3-trifluoropropene, Cis-1-chloro-1,3,3,3-tetrafluoropropene, and Trans-1-chloro-1,3,3,3-tetrafluoropropene With respect to the performance evaluation of the high-temperature heat pump cycle system using the azeotropic (like) composition containing trans-1-chloro-3,3,3-trifluoropropene, cis-1-chloro-1,3,3,3-tetrafluoropropene, and trans-1-chloro-1,3,3,3-tetrafluoropropene as the heat-transfer medium, the coefficient of performance ($COP_H$), the heating capacity, and the volumetric capacity ($CAP_H$) of the high-temperature heat pump cycle system were calculated under the conditions shown in Table 6.

Figure 6:
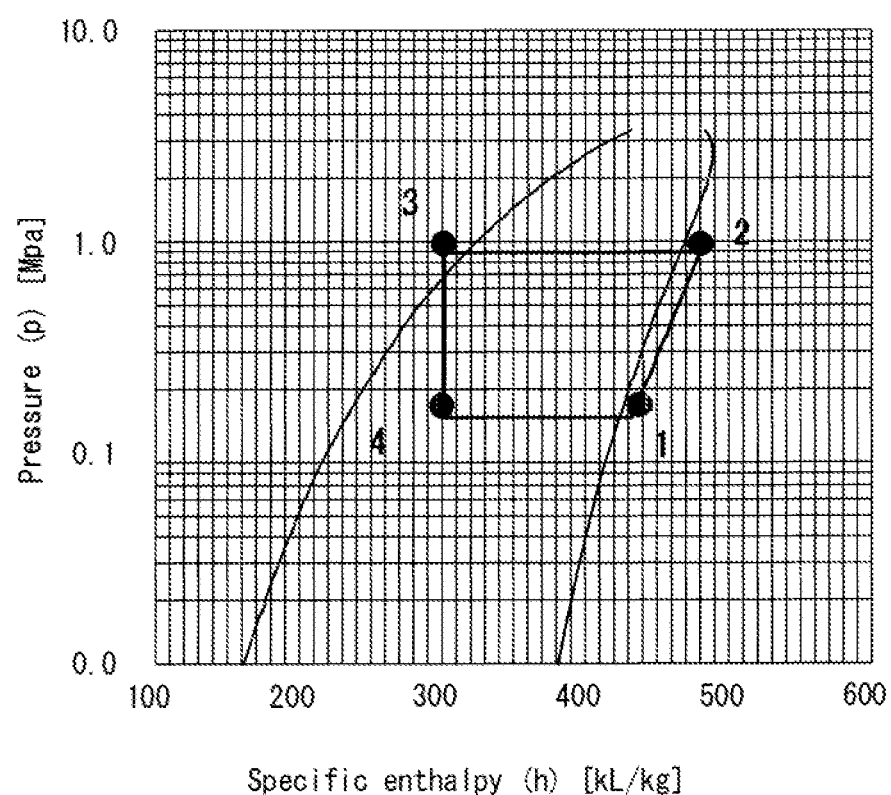
FIG. 6 is a Ph diagram in Example 6-10.

FIG. 6 shows the Ph diagram in Example 6-10. In FIG. 6, cycle points 1, 2, 3, and 4 indicate the high-temperature heat pump cycle system calculation conditions.

The calculation results using the azeotropic (like) compositions containing trans-1-chloro-3,3,3-trifluoropropene, cis-1-chloro-1,3,3,3-tetrafluoropropene, and trans-1-chloro-1,3,3,3-tetrafluoropropene at different mass ratios as the heat-transfer medium are shown as relative values in Table 8 when the coefficient of performance ($COP_R$), refrigeration capacity, and volumetric capacity ($CAP_R$) of the refrigeration cycle system of HCFC-123 calculated under the calculation conditions of Table 6 are assumed to be 1.0.

TABLE 8

Calculation results of high-temperature heat pump cycle system using azeotropic (like) composition consisting of trans-1-chloro-3,3,3-trifluoropropene, cis-1-chloro-1,3,3,3-tetrafluoropropene, and trans-1-chloro-1,3,3,3-tetrafluoropropene

| Examples | Refregerant composition (mass %) | | | Relative values (against R123) | | |
|---|---|---|---|---|---|---|
| | trans-1-chloro-3,3,3-trifluoropropene | cis-1-chloro-1,3,3,3-tetrafluoropropene | trans-1-chloro-1,3,3,3-tetrafluoropropene | Heating capacity | $COP_H$ | $CAP_h$ |
| Example 6-1 | 80 | 8 | 12 | 1.1 | 1 | 1.2 |
| Example 6-2 | 85 | 6 | 9 | 1.1 | 1 | 1.2 |
| Example 6-3 | 90 | 4 | 6 | 1.1 | 1 | 1.3 |
| Example 6-4 | 95 | 2 | 3 | 1.1 | 1 | 1.3 |
| Example 6-5 | 99 | 0.4 | 0.6 | 1.1 | 1 | 1.3 |
| Example 6-6 | 80 | 16 | 4 | 1.1 | 0.9 | 1.1 |
| Example 6-7 | 85 | 12 | 3 | 1.1 | 1 | 1.2 |
| Example 6-8 | 90 | 8 | 2 | 1.1 | 1 | 1.2 |
| Example 6-9 | 95 | 4 | 1 | 1.1 | 1 | 1.3 |
| Example 6-10 | 99 | 0.8 | 0.2 | 1.1 | 1 | 1.3 |
| Comparable example 2 | — | — | — | 1 | 1 | 1 |

As shown in Table 7 and Table 8, the coefficient of performance ($COP_H$) of the high-temperature heat pump cycle system using the azeotropic (like) composition according to an embodiment of the present invention containing trans-1-chloro-3,3,3-trifluoropropene and 1-chloro-1,3,3,3-tetrafluoropropene is comparable to that using HCFC-123 which is an existing refrigerant. Moreover, it was also proven that the volumetric capacitance ($CAP_H$) is larger than that of HCFC-123. These results mean that, when designing a high-temperature heat pump cycle system with a heating capacity equivalent to that of the refrigeration cycle system for HCFC-123, the overall system size can be reduced by using the azeotropic (like) composition of an embodiment of the present invention compared with the system for HFC-123. In addition, since the heating capacity is larger than that of HCFC-123, it also means that the same heating performance as that of HCFC-123 can be obtained by using a smaller amount of the present azeotropic (like) composition.

3. Synthesis of 1-Chloro-1,3,3,3-tetrafluoropropene

Hereinafter, the results of the synthesis of 1-chloro-1,3,3,3-tetrafluoropropene are described.

In a 500 mL three-necked flask equipped with a ball filter, a thermometer, a Dimroth condenser, and a stirrer tip, 310.36 g (2.06 mol) of 1-chloro-1,3,3,3-tetrafluoropropane (244fa) was added, a refrigerant at −10° C. was circulated in the Dimroth condenser, the flask was immersed in an ice bath at 0 to 5° C., and stirring was started. While applying UV light from outside the reactor with a 100 W high-pressure mercury vapor lamp, chlorine 142.41 g (2.02 mol) was introduced over 240 minutes. The crude product formed was washed with an aqueous solution of sodium bicarbonate to recover 305.26 g of an organic substance. Gas chromatographic analysis showed that 244fa was 0.023 area %, 1,1-dichloro-1,3,3,3-tetrafluoropropane (234fb) was 99.081 area %, while the conversion of 244fa was 99%.

Next, to a 1 L four-necked flask equipped with a dropping funnel with a volume of 500 mL, a thermometer, a Dimroth condenser, and a stirrer tip was added 404.90 g (2.19 mol) of 234fb and 17.62 g (0.05 mol) of tetrabutylammonium bromide as a phase transfer catalyst, a refrigerant at −10° C. was circulated in the Dimroth condenser, the flask was immersed in a water bath at a temperature of 20 to 25° C., and then stirring was started. From the dropping funnel, 386.3 g (2.32 mol) of a 24 wt % aqueous solution of sodium hydroxide was gradually dropped into the flask over 90 minutes. After stirring the contents in the flask for 2 hours at the same temperature, the flask was cooled with ice water, the Dimroth condenser was removed, and the flask was connected to a dry ice-acetone trap. The water temperature was raised to 30° C. to collect the fraction, resulting in 305.83 g of the product containing 1-chloro-1,3,3,3-tetrafluoropropene. The composition of the product was analyzed by gas chromatography to find that cis-1-chloro-1,3,3,3-tetrafluoropropene, which is a cis form, is 71.455 area %, trans-1-chloro-1,3,3,3-tetrafluoropropene, which is a trans form, was 27.570 area %, and the conversion of 234fb was 99%.

4. Thermal Stability Test

Thermal stability tests of the azeotropic (like) composition according to an embodiment of the present invention containing trans-1-chloro-3,3,3-trifluoropropene and 1-chloro-1,3,3,3-tetrafluoropropene were conducted. A cylinder made of SUS 304L (50 mL capacity) was washed with the sample and dried in a thermostatic oven at 50° C. After the cylinder was evacuated, 20 g of the sample was added to the cylinder using a fluoroplastic (PFA) tube. Furthermore, the cylinder was cryogenically degassed (for 10 minutes repeated three times) using liquid nitrogen. After that, the cylinder was placed in a thermostatic oven that had been preheated to 160° C. and maintained for 7 days. The thermal stability was evaluated by measuring the acid content of the obtained samples. As a comparison, the same experiment was carried out using trans-1-chloro-3,3,3-trifluoropropene and 1-chloro-1,3,3,3-tetrafluoropropene (a mixture of cis and trans forms). The results are shown in Table 9.

TABLE 9

Thermal stability test results of azeotropic (like) composition including trans-1-chloro-3,3,3-trifluoropropene and 1-chloro-1,3,3,3-tetrafluoropropene.

| | | Acid component | |
|---|---|---|---|
| | Samples | F ion (ppm) | Cl ion (ppm) |
| Before test | E-1-chloro-3,3,3-trifluoropropene | — | — |
| | 1-chloro-1,3,3,3-tetrafluoropropene | — | — |
| | E-1-chloro-3,3,3-trifluoropropene/1-chloro-1,3,3,3-tetrafluoropropene = 9/1 (molar ratio) | — | — |
| After test | E-1-chloro-3,3,3-trifluoropropene | <0.1 | 0.69 |
| | 1-chloro-1,3,3,3-tetrafluoropropene | 1.35 | 0.53 |
| | E-1-chloro-3,3,3-trifluoropropene/1-chloro-1,3,3,3-tetrafluoropropene = 9/1 (molar ratio) | <0.1 | 0.29 |

As can be clearly understood from the results shown in Table 9, no pyrolysis products were found in the azeotropic (like) composition containing trans-1-chloro-3,3,3-trifluoropropene and 1-chloro-1,3,3,3-tetrafluoropropene. This was suggested by the extremely small amount of the by-product acid component (F⁻ ion and Cl⁻ ion) of the present azeotropic (like) composition after the test compared with those of trans-1-chloro-3,3,3-trifluoropropene and 1,3,3,3-tetrafluoropropene. From the above results, it can be understood that the present azeotropic (like) composition has excellent thermal stability even under high temperature conditions.

What is claimed is:

1. A composition consisting of trans-1-chloro-3,3,3-trifluoropropene and 1-chloro-1,3,3,3-tetrafluoropropene,
    wherein 1-chloro-1,3,3,3-tetrafluoropropene exists in an effective amount to form an azeotropic mixture or an azeotropic-like mixture with trans-1-chloro-3,3,3-trifluoropropene.

2. The composition according to claim 1,
    wherein 1-chloro-1,3,3,3-tetrafluoropropene is cis-1-chloro-1,3,3,3-tetrafluoropropene, trans-1-chloro-1,3,3,3-tetrafluoropropene, or a mixture thereof.

3. The composition according to claim 1, consisting of 90.0000 mol % or more and 99.9999 mol % or less of trans-1-chloro-3,3,3-trifluoropropene and 0.0001 mol % or more and 10.0000 mol % or less of cis-1-chloro-1,3,3,3-tetrafluoropropene with respect to a total amount of trans-1-chloro-3,3,3-trifluoropropene and cis-1-chloro-1,3,3,3-tetrafluoropropene.

4. The composition according to claim 1, consisting of 80.0000 mol % or more and 99.9998 mol % or less of trans-1-chloro-3,3,3-trifluoropropene, 0.0001 mol % or more and 10.0000 mol % or less of cis-1-chloro-1,3,3,3-tetrafluoropropene, and 0.0001 mol % or more and 10.0000 mol % or less of trans-1-chloro-1,3,3,3-tetrafluoropropene with respect to a total amount of trans-1-chloro-3,3,3-trifluoropropene, cis-1-chloro-1,3,3,3-tetrafluoropropene, and trans-1-chloro-1,3,3,3-tetrafluoropropene.

5. An aerosol composition containing the composition according to claim 1.

6. A cleaning agent containing the composition according to claim 1.

7. A solvent containing the composition according to claim 1.

8. A silicone solvent containing the composition according to claim 1.

9. A foaming agent containing the composition according to claim 1.

10. A heat-transfer medium containing the composition according to claim 1.

11. A heat-transfer device containing the heat-transfer medium according to claim 10.

12. A refrigeration cycle system, a high-temperature heat pump cycle system, or an organic Rankine cycle system including the heat-transfer device according to claim 11.

13. A heat-transfer method utilizing the refrigeration cycle system or the high-temperature heat pump cycle system according to claim 12, the heat-transfer method comprising:
    performing heat-exchange on a heat-transfer medium containing a composition consisting of trans-1-chloro-3,3,3-trifluoropropene and 1-chloro-1,3,3,3-tetrafluoropropene, wherein 1-chloro-1,3,3,3-tetrafluoropropene exists in an effective amount to form an azeotropic mixture or an azeotropic-like mixture with trans-1-chloro-3,3,3-trifluoropropene with a first fluid to vaporize the heat-transfer medium;
    compressing the vaporized heat-transfer medium to form a superheated steam of the heat-transfer medium;
    performing heat-exchange on the superheated steam of the heat-transfer medium with a second fluid to liquefy the heat-transfer medium; and
    expanding the liquefied heat-transfer medium.

14. An extinguishing agent containing the composition according to claim 1.

15. A fumigant containing the composition according to claim 1.

16. A method for converting thermal energy to mechanical or electrical energy utilizing the organic Rankine cycle system according to claim 12, the method comprising:
    performing heat-exchange on a heat-transfer medium containing a composition consisting of trans-1-chloro-3,3,3-trifluoropropene and 1-chloro-1,3,3,3-tetrafluoropropene, wherein 1-chloro-1,3,3,3-tetrafluoropropene exists in an effective amount to form an azeotropic mixture or an azeotropic-like mixture with trans-1-chloro-3,3,3-trifluoropropene with a fluid to vaporize the heat-transfer medium;
    extracting the vaporized heat-transfer medium;
    expanding the extracted heat-transfer medium to convert thermal energy of the heat-transfer medium to mechanical or electrical energy; and
    condensing the converted heat-transfer medium to form a liquefied converted heat-transfer medium.

* * * * *